United States Patent
Fei et al.

(10) Patent No.: US 11,582,081 B2
(45) Date of Patent: Feb. 14, 2023

(54) REFERENCE SIGNAL SENDING METHOD, REFERENCE SIGNAL RECEIVING METHOD, AND APPARATUS

(71) Applicant: Huawei Technologies Co., Ltd., Shenzhen (CN)

(72) Inventors: Yongqiang Fei, Shenzhen (CN); Zhiheng Guo, Beijing (CN); Xinqian Xie, Beijing (CN); Wenping Bi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 79 days.

(21) Appl. No.: 17/172,981

(22) Filed: Feb. 10, 2021

(65) Prior Publication Data

US 2021/0176105 A1 Jun. 10, 2021

Related U.S. Application Data

(63) Continuation of application No. PCT/CN2019/099127, filed on Aug. 2, 2019.

(30) Foreign Application Priority Data

Aug. 10, 2018 (CN) .......................... 201810911934.9

(51) Int. Cl.
*H04L 27/26* (2006.01)
*H04L 5/00* (2006.01)
*H04L 5/14* (2006.01)

(52) U.S. Cl.
CPC ........ *H04L 27/2613* (2013.01); *H04L 5/0048* (2013.01); *H04L 5/14* (2013.01); *H04L 27/2607* (2013.01)

(58) Field of Classification Search
CPC .............. H04L 1/0038; H04L 27/2607; H04L 27/2613; H04L 27/26132; H04L 5/0048; H04L 5/14
See application file for complete search history.

(56) References Cited

U.S. PATENT DOCUMENTS

2016/0127102 A1  5/2016  Kim et al.
2016/0365958 A1  12/2016  Nam et al.

FOREIGN PATENT DOCUMENTS

CN    101330316 A     12/2008
CN    101442520 A  *   5/2009
(Continued)

OTHER PUBLICATIONS

NTT DoCoMo, Fujitsu, KDDI, LG Electronics, Mitsubishi Electric, NEC, Panasonic, Sharp, Toshiba Corporation, "Multiplexing Method for Orthogonal Reference Signals for E-UTRA Uplink," 3GPP TSG RAN WG1 Meeting #46bis, Seoul, Korea, R1-062726, total 13 pages, 3rd Generation Partnership Project, Valbonne, France (Oct. 9-13, 2006).
(Continued)

*Primary Examiner* — Melvin C Marcelo
*Assistant Examiner* — Natali Pascual Peguero
(74) *Attorney, Agent, or Firm* — Leydig, Voit & Mayer, Ltd.

(57) ABSTRACT

A reference signal sending method, a reference signal receiving method, and an apparatus are provided. A first network device determines a first resource. The first network device generates a reference signal corresponding to the first resource. The reference signal includes M parts, and all of the M parts are the same. The first resource does not carry a cyclic postfix of the reference signal. Alternatively, the first resource carries a cyclic prefix of the reference signal and the cyclic prefix corresponding to the reference signal is located only at the start of the $1^{st}$ part in the M parts. M is
(Continued)

a positive integer. The first network device sends the reference signal to a second network device on the first resource.

16 Claims, 21 Drawing Sheets

(56) References Cited

FOREIGN PATENT DOCUMENTS

| | | | |
|---|---|---|---|
| CN | 101442520 | A | 5/2009 |
| CN | 101938777 | A | 1/2011 |
| CN | 103391621 | A | 11/2013 |
| CN | 105744639 | A | 7/2016 |
| CN | 108282302 | A | 7/2018 |
| JP | 2017005768 | A | 1/2017 |
| WO | 2017075807 | A1 | 5/2017 |
| WO | 2018082068 | A1 | 5/2018 |

OTHER PUBLICATIONS

Yan-Bo et al., "Symbol synchronization Algorithm based on Pseudo-superimposed Zadoff-Chu in Advanced-LTE," 2009 Asia-Pacific Conference on Information Processing, pp. 140-143, Institute of Electrical and Electronics Engineers, New York, New York (Jul. 2009).

Vihriala et al., "Frame Structure Design for Future Millimetre Wave Mobile Radio Access," 2016 IEEE Globecom Workshops (GC Wkshps), Total 6 pages, Institute of Electrical and Electronics Engineers, New York, New York (Dec. 2016).

CMCC, "Discussion on intra-operator and inter-operator synchronization for small cell enhancement," 3GPP TSG RAN WG1 Meeting #76, Prague, Czech Republic, R1-140594, total 7 pages, 3rd Generation Partnership Project, Valbonne, France (Feb. 10-14, 2014).

CMCC, "Study on Remote Interference Management in NR," 3GPP TSG RAN Meeting #79, Chennai, India, RP-180311, total 4 pages, 3rd Generation Partnership Project, Valbonne, France (Mar. 19-22, 2018).

"3rd Generation Partnership Project; Technical Specification Group Radio Access Network; NR; Physical channels and modulation (Release 15)," 3GPP TS 38.211 V15.2.0, total 96 pages, 3rd Generation Partnership Project, Valbonne, France (Jun. 2018).

\* cited by examiner

REFERENCE SIGNAL SENDING METHOD, REFERENCE SIGNAL RECEIVING METHOD, AND APPARATUS

CROSS-REFERENCE TO RELATED APPLICATIONS

This application is a continuation of International Application No. PCT/CN2019/099127, filed on Aug. 2, 2019, which claims priority to Chinese Patent Application No. 201810911934.9, filed on Aug. 10, 2018. The disclosures of the aforementioned applications are hereby incorporated by reference in their entireties.

TECHNICAL FIELD

This application relates to the field of communications technologies, and in particular, to a reference signal sending method, a reference signal receiving method, and an apparatus.

BACKGROUND

In a wireless communications system such as a new radio (NR) system, a long term evolution (LTE) system, or an LTE-advanced (LTE-A) system, if a duplex mode of time division duplex (TDD) is used in the system, cross-link interference (CLI) may be generated between base stations (BS). The cross-link interference between base stations mainly means that a downlink (DL) signal sent by one base station interferes with an uplink (UL) signal of another base station, and the uplink signal is, for example, a signal sent by user equipment (UE) to the base station. For example, when a first base station sends a downlink signal, a second base station is receiving an uplink signal, and the downlink signal sent by the first base station usually has relatively high power and may be received by the second base station. Consequently, interference is caused to uplink signal receiving of the second base station.

CLI between base stations usually occurs when two TDD cells working on a same frequency have different transmission directions. Therefore, if the transmission directions in the TDD cells remain the same, usually, CLI is not generated. However, there is an exception. For example, when the troposphere in the atmosphere is bent to form an atmospheric duct, even if two base stations are located very far away from each other, downlink transmission signals of the two base stations still have relatively high strength when arriving at opposite parties. As a result, even if transmission directions of the two base stations are the same, that is, the two base stations simultaneously receive uplink signals and simultaneously send downlink signals, because the two base stations are located relatively far away from each other, a definite delay is generated when a downlink signal sent by one base station arrives at the other base station, and the other base station possibly may have switched to an uplink receiving direction. In this case, CLI is also generated between the two base stations. To resolve this problem, measurement between base stations may be considered, to identify an interfering base station. However, currently, there is no standardized mechanism of measurement between base stations. In addition, the atmospheric duct is closely related to the weather and a geographical environment, and is random and uncertain. As a result, a distance and a delay between two base stations that interfere with each other are also relatively highly uncertain. In the conventional technology, a method for measurement between a base station and a terminal device is designed for a determined sending or receiving time. Consequently, it is difficult to meet a requirement of obtaining, through detection with low complexity and high accuracy, a reference signal with an unknown arrival time.

SUMMARY

Embodiments of this application provide a reference signal sending method, a reference signal receiving method, and an apparatus, so that a reference signal can be transmitted between network devices.

According to a first aspect, a reference signal sending method is provided. The method includes: determining a first resource; generating a reference signal corresponding to the first resource, where the reference signal includes M parts; all of the M parts are the same; the first resource does not carry a cyclic prefix of the reference signal or a cyclic postfix of the reference signal; or the first resource carries a cyclic prefix of the reference signal and the cyclic prefix corresponding to the reference signal is located only at the start of the $1^{st}$ part in the M parts, and/or the first resource carries a cyclic postfix of the reference signal and the cyclic postfix corresponding to the reference signal is located only at the end of the last part in the M parts; and M is a positive integer; and sending the reference signal on the first resource.

The method may be performed by a first communications apparatus. The first communications apparatus may be a first network device or a communications apparatus that can support the first network device in implementing a function required in the method. Certainly, the first communications apparatus may alternatively be another communications apparatus, for example, a chip system.

According to a second aspect, a reference signal receiving method is provided. The method includes: determining a second resource used to receive a reference signal, where a time-domain symbol included in the second resource is an uplink time-domain symbol and/or a guard period time-domain symbol; and receiving a part or all of the reference signal on the second resource, where the reference signal includes M parts; all of the M parts are the same; the reference signal is sent on a first resource; the first resource does not carry a cyclic prefix of the reference signal or a cyclic postfix of the reference signal; or the first resource carries a cyclic prefix of the reference signal and the cyclic prefix corresponding to the reference signal is located only at the start of the $1^{st}$ part in the M parts, and/or the first resource carries a cyclic postfix of the reference signal and the cyclic postfix corresponding to the reference signal is located only at the end of the last part in the M parts; and M is a positive integer.

The method may be performed by a second communications apparatus. The second communications apparatus may be a second network device or a communications apparatus that can support the second network device in implementing a function required in the method. Certainly, the second communications apparatus may alternatively be another communications apparatus, for example, a chip system.

In the embodiments of this application, the reference signal carried on the first resource includes the M parts. For frequency-domain correlation detection, it needs to be ensured that at least one complete to-be-detected sample can be observed in a time-domain detection window. The observed to-be-detected sample may be a to-be-detected sample obtained after a cyclic shift, and each of the M parts may be used as one complete to-be-detected sample. In this case, the M parts need to be the same. Therefore, content of the M parts of the reference signal is the same. In addition, the cyclic prefix corresponding to the reference signal or the cyclic postfix corresponding to the reference signal may not be included between the M parts, the cyclic prefix may be added only to the start of the $1^{st}$ part in the M parts or may not be added, and the cyclic postfix may be added only to the end of the last part in the M parts or may not be added, so that the reference signal can have a circularity characteristic on the first resource. The reference signal has the circularity characteristic on the first resource, so that the second network device can perform, through frequency-domain correlation detection, blind detection on the reference signal sent by the first network device, and correctly obtain the reference signal. Therefore, detection complexity is reduced, and blind detection accuracy is improved; in other words, a requirement of obtaining, through detection with low complexity and high accuracy, a reference signal with an unknown arrival time is met.

In a possible design, initial phases corresponding to the M parts are the same, or base sequence group numbers, base sequence numbers, and cyclic shifts corresponding to the M parts are the same.

To enable all of the M parts to be the same, if a generation manner using a pseudo-random sequence+constellation modulation is reused, each of the M parts may be enabled to have a same initial phase, to enable all of the M parts to be the same. Certainly, this manner is merely one manner of enabling all of the M parts to be the same. If the generation manner using a pseudo-random sequence+constellation modulation is reused, the embodiments of this application are not limited thereto, and another manner may be used to enable all of the M parts to be the same. If a generation manner using a low-PAPR sequence is used, each of the M parts may be enabled to have a same cyclic shift, a same base sequence group number, and a same base sequence number, to enable all of the M parts to be the same. Certainly, this manner is merely one manner of enabling all of the M parts to be the same. If the generation manner using a low-PAPR sequence is reused, the embodiments of this application are not limited thereto, and another manner may be used to enable all of the M parts to be the same. Certainly, the reference signal may alternatively be generated in another manner. In this case, there is naturally a manner of enabling all of the M parts to be the same for the another generation manner. All of these manners fall within the protection scope of the embodiments of this application.

In a possible design, the initial phases corresponding to the M parts or the base sequence group numbers, base sequences, and the cyclic shifts corresponding to the M parts are determined based on time-domain information of the first resource.

The time-domain information of the first resource is, for example, a time-domain location of the first resource, or may be other information such as a time-domain length. This is not limited in the embodiments of this application.

In a possible design, the time-domain information of the first resource includes at least one of the following information: a slot in which the first resource is located or a slot included in the first resource, at least one time-domain symbol included in the first resource, a subframe in which the first resource is located or subframes included in the first resource, an uplink-downlink switching period in which the first resource is located, and a system frame in which the first resource is located.

In other words, the initial phases corresponding to the M parts or the base sequence group numbers, the base sequences, and the cyclic shifts corresponding to the M parts may be determined based on one or more of the foregoing information, or the initial phases corresponding to the M parts or the base sequence group numbers, the base sequences, and the cyclic shifts corresponding to the M parts may be determined with reference to one or more of the foregoing information and other time-domain information of the first resource, or the foregoing information may not be used, instead, the initial phases corresponding to the M parts or the base sequence group numbers, the base sequences, and the cyclic shifts corresponding to the M parts are determined based on other time-domain information of the first resource. This is not limited in the embodiments of this application.

In a possible design, that the time-domain information of the first resource includes the time-domain symbol included in the first resource includes: The first resource includes N time-domain symbols, the N time-domain symbols are consecutive time-domain symbols, and N is a positive integer. The initial phases corresponding to the M parts or the base sequence group numbers, the base sequences, and the cyclic shifts corresponding to the M parts are determined based on the $1^{st}$ time-domain symbol or the last time-domain symbol in the N time-domain symbols.

The foregoing is merely an example. A time-domain symbol used to determine the initial phases corresponding to the M parts or the base sequence group numbers, the base sequences, and the cyclic shifts corresponding to the M parts is not limited in the embodiments of this application.

In a possible design, the N time-domain symbols are the last N time-domain symbols in a downlink transmission duration in one uplink-downlink switching period.

The reference signal is sent by using the last time-domain symbol in the downlink transmission duration in the uplink-downlink switching period, so that a maximum interference range can be determined first. Because the N time-domain symbols occupied by the reference signal are the last N time-domain symbols in the downlink transmission duration, after obtaining the reference signal through detection, the second network device can determine that no CLI interference is caused to a range after the reference signal is obtained through detection, so that an interference cancellation means can be further applied, for example, lower-order modulation, a lower bit rate, or the like is used for an area receiving CLI interference, to reduce or eliminate the interference. Second, a detection success rate can be ensured to the greatest extent.

In a possible design, the method further includes: sending configuration information, where the configuration information is used to indicate the first resource, and/or the configuration information is used to indicate the reference signal. Correspondingly, the method further includes: receiving the configuration information, where the configuration information is used to indicate the first resource, and/or the configuration information is used to indicate the reference signal.

In the embodiments of this application, if the first network device and the second network device are network devices located relatively close to each other, a difference between measurement between the first network device and the second network device and measurement between network devices located super far away from each other lies in that the second network device can obtain the configuration information in advance. For the second network device, the configuration information is used to determine the first resource, and/or is used to determine the reference signal. In other words, the configuration information can be used to determine the first resource, or the configuration information can be used to determine the reference signal, or the configuration information can be used to determine the first resource and the reference signal. The second network device can determine, by using the configuration information, a configuration used by the first network device to send the reference signal, and can further determine a location of a to-be-detected time-frequency resource and/or determine a to-be-detected reference signal.

In a possible design, the reference signal is a reference signal that is sent by the first network device and that is received by the second network device.

The reference signal may be a reference signal used for measurement between network devices. According to the solutions provided in the embodiments of this application, the reference signal may be transmitted between network devices, so that measurement can be implemented by using the reference signal.

According to a third aspect, a first communications apparatus is provided. The communications apparatus is, for example, the first communications apparatus described above, for example, a network device. The communications apparatus has a function of implementing the network device in the foregoing method design. The function may be implemented by using hardware, or may be implemented by executing corresponding software by hardware. The hardware or the software includes one or more units corresponding to the foregoing function.

In a possible design, a specific structure of the communications apparatus may include a processing module and a transceiver module. The processing module and the transceiver module may perform the corresponding function in the method provided in any one of the first aspect or the possible implementations of the first aspect.

According to a fourth aspect, a second communications apparatus is provided. The communications apparatus is, for example, the second communications apparatus described above, for example, a terminal device. The communications apparatus has a function of implementing the terminal device in the foregoing method design. The function may be implemented by using hardware, or may be implemented by executing corresponding software by hardware. The hardware or the software includes one or more units corresponding to the foregoing function.

In a possible design, a specific structure of the communications apparatus may include a processing module and a transceiver module. The processing module and the transceiver module may perform the corresponding function in the method provided in any one of the second aspect or the possible implementations of the second aspect.

According to a fifth aspect, a third communications apparatus is provided. The communications apparatus is, for example, the first communications apparatus described above, for example, a network device. The communications apparatus has a function of implementing the network device in the foregoing method design. The function may be implemented by using hardware, or may be implemented by executing corresponding software by hardware. The hardware or the software includes one or more units corresponding to the foregoing function.

In a possible design, a specific structure of the communications apparatus may include a processor and a transceiver. The processor and the transceiver may perform the corresponding function in the method provided in any one of the first aspect or the possible implementations of the first aspect. The transceiver is implemented as, for example, a communications interface. The communications interface herein may be understood as a radio frequency transceiver component in the network device.

According to a sixth aspect, a fourth communications apparatus is provided. The communications apparatus is, for example, the second communications apparatus described above, for example, a terminal device. The communications apparatus has a function of implementing the terminal device in the foregoing method design. The function may be implemented by using hardware, or may be implemented by executing corresponding software by hardware. The hardware or the software includes one or more units corresponding to the foregoing function.

In a possible design, a specific structure of the communications apparatus may include a processor and a transceiver. The processor and the transceiver may perform the corresponding function in the method provided in any one of the second aspect or the possible implementations of the second aspect. The transceiver is implemented as, for example, a communications interface. The communications interface herein may be understood as a radio frequency transceiver component in the terminal device.

According to a seventh aspect, a fifth communications apparatus is provided. The communications apparatus may be the first communications apparatus in the method design, for example, a network device, or a chip disposed in a network device. The communications apparatus includes a memory, configured to store computer executable program code; and a processor, where the processor is coupled to the memory. The program code stored in the memory includes an instruction, and when the processor executes the instruction, the fifth communications apparatus is enabled to perform the method in any one of the first aspect or the possible implementations of the first aspect.

The fifth communications apparatus may further include a communications interface. If the fifth communications apparatus is a network device, the communications interface may be a transceiver in the network device, for example, a radio frequency transceiver component in the network device; or if the fifth communications apparatus is a chip disposed in a network device, the communications interface may be an input/output interface of the chip, for example, an input/output pin.

According to an eighth aspect, a sixth communications apparatus is provided. The communications apparatus may be the second communications apparatus in the method design, for example, a terminal device, or a chip disposed in a terminal device. The communications apparatus includes a memory, configured to store computer executable program code; and a processor, where the processor is coupled to the memory. The program code stored in the memory includes an instruction, and when the processor executes the instruction, the sixth communications apparatus is enabled to perform the method in any one of the second aspect or the possible implementations of the second aspect.

The sixth communications apparatus may further include a communications interface. If the sixth communications apparatus is a terminal device, the communications interface may be a transceiver in the terminal device, for example, a radio frequency transceiver component in the terminal device; or if the sixth communications apparatus is a chip disposed in a terminal device, the communications interface may be an input/output interface of the chip, for example, an input/output pin.

According to a ninth aspect, a first communications system is provided. The communications system may include the first communications apparatus described in the third aspect and the second communications apparatus described in the fourth aspect.

According to a tenth aspect, a second communications system is provided. The communications system may include the third communications apparatus described in the fifth aspect and the fourth communications apparatus described in the sixth aspect.

According to an eleventh aspect, a third communications system is provided. The communications system may include the fifth communications apparatus described in the seventh aspect and the sixth communications apparatus described in the eighth aspect.

According to a twelfth aspect, a computer storage medium is provided. The computer-readable storage medium stores an instruction, and when the instruction is run on a computer, the computer is enabled to perform the method in the first aspect or any possible design of the first aspect.

According to a thirteenth aspect, a computer storage medium is provided. The computer-readable storage medium stores an instruction, and when the instruction is run on a computer, the computer is enabled to perform the method in the second aspect or any possible design of the second aspect.

According to a fourteenth aspect, a computer program product including an instruction is provided. The computer program product stores the instruction, and when the computer program product runs on a computer, the computer is enabled to perform the method in the first aspect or any possible design of the first aspect.

According to a fifteenth aspect, a computer program product including an instruction is provided. The computer program product stores the instruction, and when the computer program product runs on a computer, the computer is enabled to perform the method in the second aspect or any possible design of the second aspect.

In the embodiments of this application, content of the M parts of the reference signal carried on the first resource is the same, and the reference signal may have a circularity characteristic on the first resource. Such a reference signal is used, so that a network device can perform, through frequency-domain correlation detection, blind detection on the reference signal, thereby reducing detection complexity, and improving detection accuracy.

DESCRIPTION OF EMBODIMENTS

Figure 1:
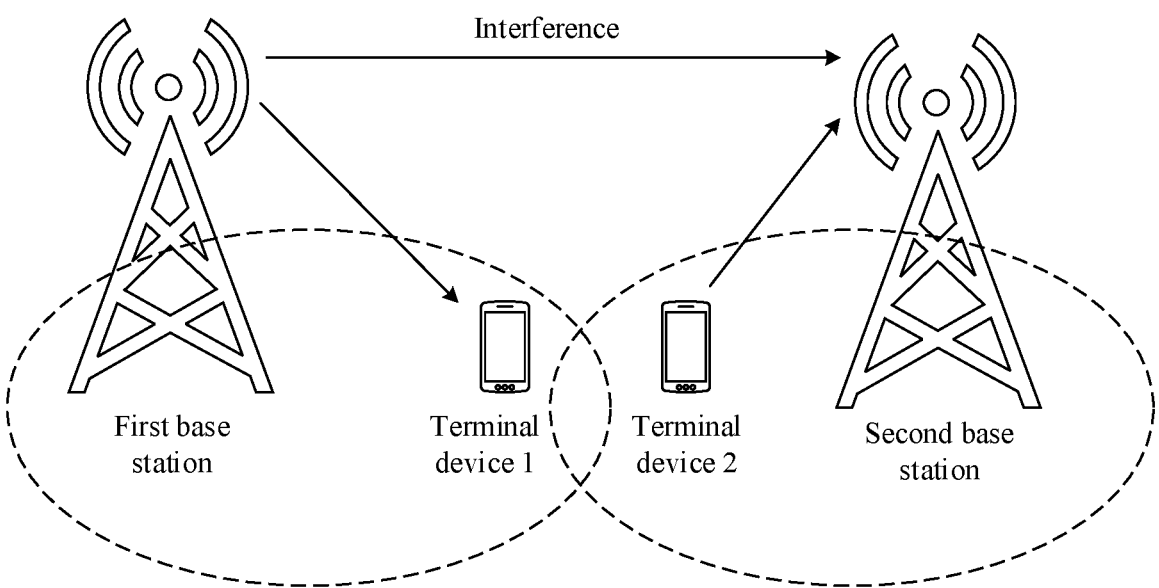
FIG. 1 is a schematic diagram of CLI between two base stations.

To make the objectives, the technical solutions and advantages of the embodiments of this application clearer, the following further describes the embodiments of this application in detail with reference to the accompanying drawings.

The following describes some terms in the embodiments of this application, to facilitate understanding of a person skilled in the art.

(1) A terminal device includes a device that provides a user with voice and/or data connectivity, for example, may include a handheld device with a wireless connection function, or a processing device connected to a wireless modem. The terminal device may communicate with a core network by using a radio access network (RAN), and exchange a voice and/or data with the RAN. The terminal device may include user equipment (UE), a wireless terminal device, a mobile terminal device, a subscriber unit (subscriber unit), a subscriber station, a mobile station, a mobile console (mobile), a remote station, an access point (AP), a remote terminal, an access terminal device (access terminal), a user terminal device (user terminal), a user agent, a user device, or the like. For example, the terminal device may include a mobile phone (or referred to as a "cellular" phone), a computer having a mobile terminal device, a portable, pocket-sized, handheld, computer built-in, or in-vehicle mobile apparatus, or an intelligent wearable device. For example, it may be a device such as a personal communication service (PCS) phone, a cordless telephone set, a session initiation protocol (SIP) phone, a wireless local loop (WLL) station, or a personal digital assistant (PDA). The terminal device further includes a limited device, for example, a device with relatively low power consumption, a device with a limited storage capability, or a device with a limited computing capability. For example, the terminal device includes an information sensing device such as a bar code, a radio frequency identification (RFID), a sensor, a global positioning system (GPS), or a laser scanner.

By way of example rather than limitation, in the embodiments of this application, the terminal device may alternatively be a wearable device. The wearable device may also be referred to as a wearable intelligent device, and is a collective name of wearable devices, for example, glasses, gloves, watches, clothes, and shoes, obtained after a wearable technology is used to perform intelligent design and development on daily wearable devices. A wearable device is a portable device that is directly worn on the body, or integrated into a cloth or an accessory of a user. The wearable device not only is a hardware device, but also implements a powerful function through software support, data exchange, and cloud interaction. A generalized wearable intelligent device includes a large-sized wearable device providing complete functions and capable of implementing all or some functions without relying on a smartphone, for example, a smart watch or smart glasses, and includes a wearable device focusing on a particular type of application function and needing to be used together with another device such as a smartphone, for example, various smart bands performing vital sign monitoring, intelligent head sets, and intelligent jewelries.

(2) A network device includes, for example, a base station (for example, an access point). The base station may refer to a device in communication with a wireless terminal device in one or more cells over an air interface in an access network. The network device may be configured to mutually convert a received over-the-air frame and an Internet Protocol (IP) packet and serve as a router between the terminal device and a rest portion of the access network, where the rest portion of the access network may include an IP network. The network device may further coordinate attribute management of the air interface. For example, the network device may include an evolved NodeB (NodeB, eNB, or e-NodeB, evolved Node B) in an LTE system or LTE-A, or may include a next generation NodeB (next generation node B, gNB) in a fifth generation mobile communications technology (fifth generation, 5G) NR system, or may include a central unit (CU) and a distributed unit (DU) in a cloud radio access network (CloudRAN) system. This is not limited in the embodiments of this application.

(3) The terms "system" and "network" may be used interchangeably in the embodiments of this application. "A plurality of" means two or more than two. In view of this, "a plurality of" may also be understood as "at least two" in the embodiments of this application. "At least one" may be understood as one or more, for example, may be understood as one, two, or more. For example, including at least one means including one, two, or more, and does not limit which one is included. For example, if at least one of A, B, and C is included, A may be included, B may be included, C may be included, A and B may be included, A and C may be included, B and C may be included, or A, B, and C may be included. Similarly, understanding of descriptions such as "at least one type" is similar. The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects.

Unless otherwise specified, ordinal numbers such as "first" and "second" mentioned in the embodiments of this application are used to distinguish between a plurality of objects, and are not intended to limit a sequence, a time sequence, priorities, or importance degrees of the plurality of objects.

The foregoing describes some concepts in the embodiments of this application, and the following describes technical features in the embodiments of this application.

In a wireless communications system such as an NR system, an LTE system, or an LTE-A system, if the system uses a duplex mode of TDD, CLI may be generated between base stations. For example, when a first base station sends a downlink signal, a second base station is receiving an uplink signal, and the downlink signal sent by the first base station usually has relatively high power and may be received by the second base station. Consequently, interference is caused to uplink signal receiving of the second base station. For example, referring to FIG. 1, a first cell and a second cell (which may be considered as a first base station in the first cell and a second base station in the second cell) in FIG. 1 work on a same frequency band. In the first cell, the first base station is sending a downlink signal to a terminal device 1, and at the same time, in the second cell, the second base station is receiving an uplink (uplink, UL) signal sent by a terminal device 2. The downlink signal sent by the first base station generally has relatively high power, and may also be received by the second base station. In this case, interference is caused to receiving, by the second base station, the uplink signal sent by the terminal device 2. As a result, the downlink signal of the first cell interferes with uplink signal receiving of the second cell.

Figure 2:
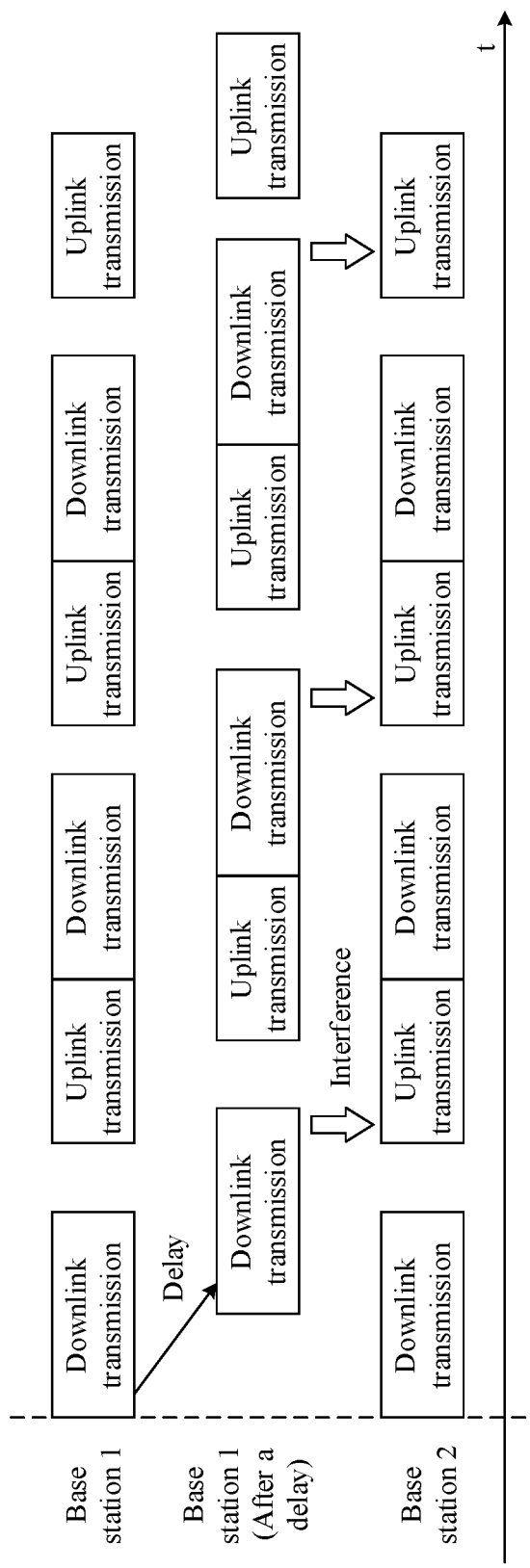
FIG. 2 is a schematic diagram of CLI between base stations located relatively far away from each other.

CLI between base stations usually occurs when two TDD cells working on a same frequency have different transmission directions. Therefore, if the transmission directions in the TDD cells remain the same, usually, CLI is not generated. However, there is an exception. For example, for two base stations located very far away from each other, even if the two base stations have a same transmission direction, in other words, the two base stations simultaneously receive uplink signals and simultaneously send downlink signals, because the two base stations are located relatively far away from each other, a definite delay is generated when a downlink signal sent by one base station arrives at the other base station, and the other base station may have switched to an uplink receiving direction. In this case, CLI is also generated between the two base stations. For example, referring to FIG. 2, transmission directions of a base station 1 and a base station 2 are originally the same. However, due to a relatively long distance between the base station 1 and the base station 2, there is a delay when a downlink signal sent by the base station 1 arrives at the base station 2. In this case, the base station 2 has started an uplink signal receiving process, and the downlink signal sent by the base station 1 still interferes with uplink signal receiving of the base station 2. The super-long-distance interference from the base station located far away is usually caused by tropospheric bending, and whether interference is caused between base stations, an interference distance, a delay, and the like are affected by a geographical location and the weather. As a result, there is high uncertainty.

To deal with super-long-distance interference, measurement between base stations may be considered, to identify an interfering base station. However, in the NR system, currently, a reference signal for channel status measurement between NR base stations (for example, gNBs) (for example, between gNBs) is not standardized, and a related measurement process is not standardized either.

Figure 3:
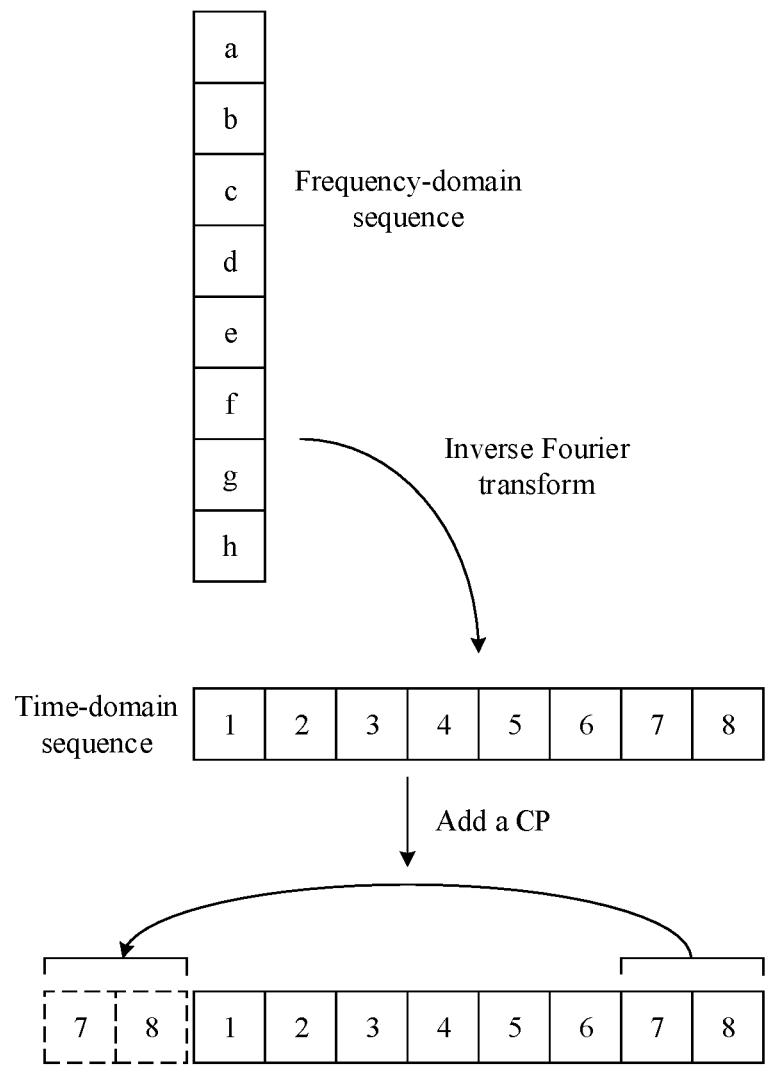
FIG. 3 is a schematic diagram of generating a CSI-RS.

In terms of a status of a channel between a gNB and a terminal device, in a downlink direction, the terminal device may obtain a status of a downlink channel between the gNB and the terminal device by using a channel state information reference signal (CSI-RS) sent by the gNB to the terminal device. First, logic of generating the CSI-RS to be sent by the gNB to the terminal device is briefly described. Referring to FIG. 3, in an orthogonal frequency division multiplexing (orthogonal frequency division multiplexing, OFDM) symbol (symbol), a CSI-RS is a sequence defined in frequency domain. For example, a frequency-domain sequence is {a, b, c, d, e, f, g, h}. The sequence is transformed to a time domain through inverse Fourier transform, for example, a time-domain sequence is {1, 2, 3, 4, 5, 6, 7, 8}. After the sequence is transformed to the time domain, some sampling points in a end part of the time-domain sequence are added to a start part as a cyclic prefix (cyclic prefix, CP). For example, an obtained time-domain sequence to which the CP is added is {7, 8, 1, 2, 3, 4, 5, 6, 7, 8}, where 7 and 8 in the start part are the CP. Finally, the base station sends the CSI-RS to which the CP is added.

The CSI-RS frequency-domain sequence is obtained by performing quadrature phase shift keying (QPSK) modulation on a Gold sequence, and the CSI-RS depends on an initial phase of the Gold sequence corresponding to the CSI-RS. A formula of the initial phase is:

$$C_{init}=(2^{10}\cdot(14n_{s,f}^{\mu}+l+1)\cdot(2n_{ID}+1)+n_{ID}) \bmod 2^{31} \quad \text{(formula 1), where}$$

l (L in lower case) represents a symbol number, of an OFDM symbol carrying the CSI-RS, in a slot, $n_{s,f}^{\mu}$ represents a slot number, of a slot (slot) that carries the CSI-RS and that uses $\Delta f=2^{\mu}\cdot 15$ [kHz] as a subcarrier spacing, in a radio frame, and $n_{ID}$ is a scrambling code ID determined by a higher-layer parameter, and is common to CSI-RSs on all symbols.

Figure 4:
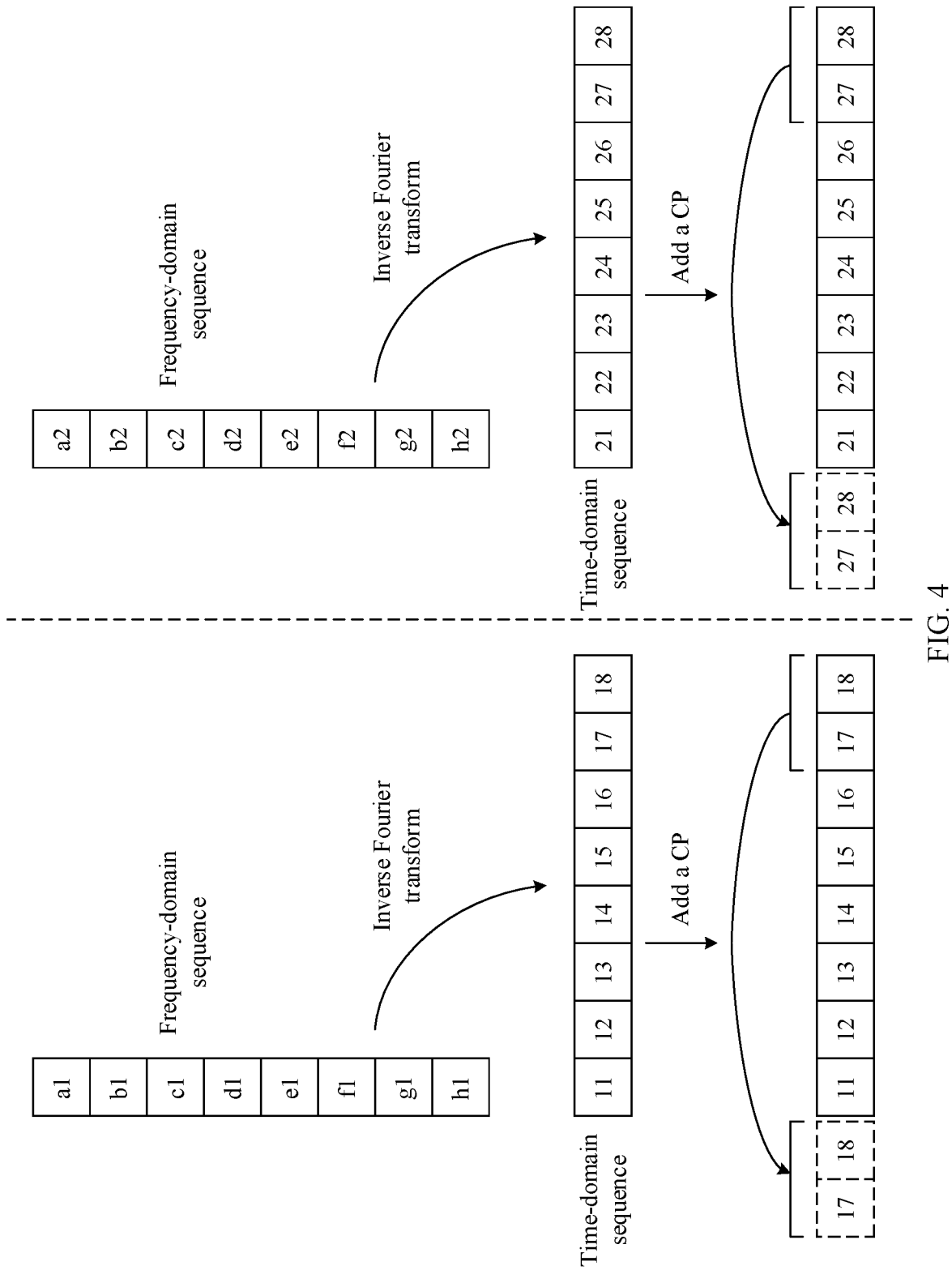
FIG. 4 is a schematic diagram showing that two neighboring symbols carry different CSI-RS s.

It can be learned that values of l of two neighboring OFDM symbols are definitely different. Therefore, CSI-RSs carried on the two neighboring OFDM symbols have different initial phases; in other words, the CSI-RSs on the two neighboring OFDM symbols are different. For this, refer to FIG. 4. In FIG. 4, a dashed line separates different OFDM symbols.

It should be noted that the CSI-RS is a reference signal used for measurement between a base station and a terminal device served by the base station in an existing standard.

In the embodiments of this application, a reference signal to be sent by one base station to another base station is designed.

Figure 5:
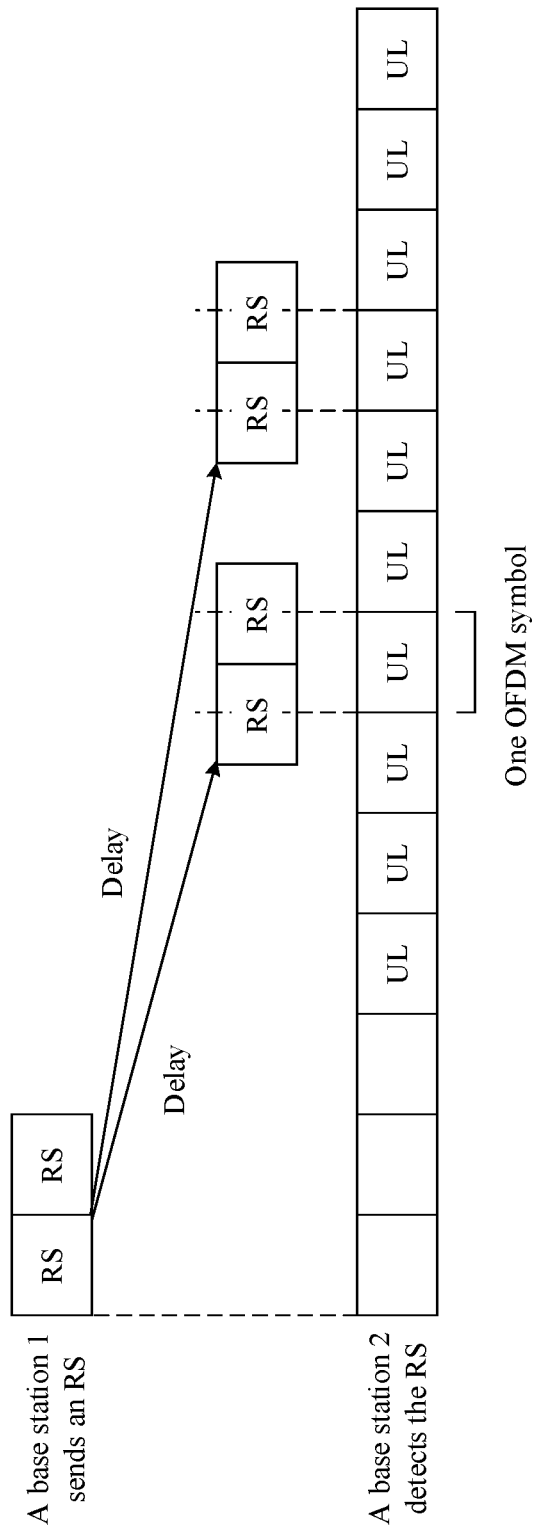
FIG. 5 is a schematic diagram showing that a base station 2 performs frequency-domain correlation detection on a reference signal sent by a base station 1.

Assuming that it is expected to perform channel measurement or signal detection between base stations in a manner similar to a manner of CSI-RS measurement between a base station and a terminal device, it is difficult to apply a CSI-RS between a base station and a terminal device in the conventional technology to measurement between base stations, and particularly, it is difficult to apply the CSI-RS between a base station and a terminal device to measurement between base stations that is used to deal with super-long-distance interference. A reason is as follows: Because a delay when a signal sent by a first base station arrives at a second base station is uncertain, the second base station can detect, only through blind detection, a reference signal (RS) sent by the first base station. If correlation detection is performed in time domain, time-domain sliding window correlation detection needs to be performed on sampling points one by one, and convolution calculation needs to be performed at a location of each sampling point. Consequently, calculation overheads are very high. When correlation detection is performed in frequency domain, correlation calculation results corresponding to a plurality of sampling points may be obtained at one time through "Fourier transform-frequency-domain point multiplication-inverse Fourier transform". Therefore, complexity of the frequency-domain correlation detection is relatively low, and it is more advantageous to perform measurement between base stations through frequency-domain correlation detection. For frequency-domain correlation detection, it needs to be ensured that at least one complete to-be-detected sample can be observed in a detection window in time domain. The observed to-be-detected sample may be a to-be-detected sample obtained after a cyclic shift. Therefore, if a reference signal needs to be detected by using a frequency-domain correlation detection method, it should be ensured that the reference signal has a cyclic shift characteristic. In other words, the reference signal may include several repeated parts, all of the parts are the same, and each part is equivalent to one complete to-be-detected sample. From a mathematical perspective, a circular sequence x(n) whose total length is N should meet x(n)=x(n+K), x(n)=x(n+K) is true for n=0, 1, 2, ..., N−K−1, and K is a constant, for example, a length of each part, related to a circularity characteristic. When at least one of the repeated parts is obtained through detection in the detection window, it can be determined that the reference signal is obtained through detection. For example, the detection window is one OFDM symbol, and the length of each of the repeated parts included in the reference signal is also one OFDM symbol. Then, reference signals carried on consecutive OFDM symbols need to be the same. For example, referring to FIG. 5, a base station 2 performs frequency-domain correlation detection on an RS sent by a base station 1. For example, for the detection window having a length of one OFDM symbol, based on a characteristic of frequency-domain correlation detection, it needs to be ensured that RSs sent by the base station 1 and carried on consecutive OFDM symbols are the same, and the circularity characteristic needs to be ensured.

If measurement between base stations, particularly, measurement that is between base stations located super far away from each other and that is caused by an atmospheric duct effect, needs to be performed directly by using an existing reference signal (for example, a CSI-RS), a receiving base station needs to perform blind detection on the reference signal on each uplink symbol and each guard period symbol. In a possible method, the receiving base station performs frequency-domain correlation detection on the reference signal (for example, the CSI-RS). However, currently, there are problems when a base station performs frequency-domain correlation detection by using a CSI-RS. For example, there are two problems as follows:

(1) As analyzed above, initial phases of Gold sequences corresponding to two CSI-RSs on two neighboring OFDM symbols are different. As a result, the CSI-RSs on the two neighboring OFDM symbols are inevitably different, and an equivalent circular convolution effect in FIG. 5 cannot be achieved.

(2) Due to a CP adding manner of a CSI-RS, two neighboring OFDM symbols do not have a circularity characteristic. To be specific, even if the problem in (1) can be resolved, and a same CSI-RS can be sent on neighboring OFDM symbols, referring to FIG. 4, the sent CSI-RS is in a form of "78-12345678-78-12345678". It (namely, the form of 78-12345678) is circular only in one OFDM symbol, but there is no circularity between two OFDM symbols. For a characteristic of circularity between two OFDM symbols, it needs to be ensured that there is a form of "12345678-12345678".

It can be learned that measurement between base stations cannot be completed by using the reference signal in the conventional technology.

In view of this, in the embodiments of this application, a reference signal carried on a first resource includes M parts. For frequency-domain correlation detection, it needs to be ensured that at least one complete to-be-detected sample can be observed in a time-domain detection window. The observed to-be-detected sample may be a to-be-detected sample obtained after a cyclic shift, and each of the M parts may be used as one complete to-be-detected sample. In this case, the M parts need to be the same. Therefore, content of the M parts of the reference signal is the same. In addition, a cyclic prefix and a cyclic postfix corresponding to the reference signal may not be included between the M parts, the cyclic prefix may be added only to a start of the $1^{st}$ part in the M parts or may not be added, and the cyclic postfix may be added only at the end of the last part in the M parts or may not be added. Therefore, the reference signal may have a circularity characteristic on the first resource. The reference signal has the circularity characteristic on the first resource, so that a network device can perform, through frequency-domain correlation detection, blind detection on the reference signal, and correctly obtain the reference signal. Therefore, detection complexity is reduced, and blind detection accuracy is improved.

The embodiments of this application may be applied to a 5G NR system, or may be applied to another communications system such as an LTE system. The technical solutions provided in the embodiments of this application can be applied to a communications system, provided that one entity needs to send a signal and another entity needs to receive or measure the signal in the communications system. Certainly, the reference signal provided in the embodiments of this application may also be applied to a scenario in which a base station sends the reference signal to a terminal device, or applied to a scenario in which a terminal device sends the reference signal to a base station. This is not limited in the embodiments of this application. The embodiments of this application merely describe, by way of example, a scenario in which a first network device sends a reference signal to a second network device.

The foregoing describes the existing problems, and describes a communications system to which the embodiments of this application may be applied. The following describes an application scenario of the embodiments of this application, or a network architecture to which the embodiments of this application are applied, referring to FIG. 6.

Figure 6:
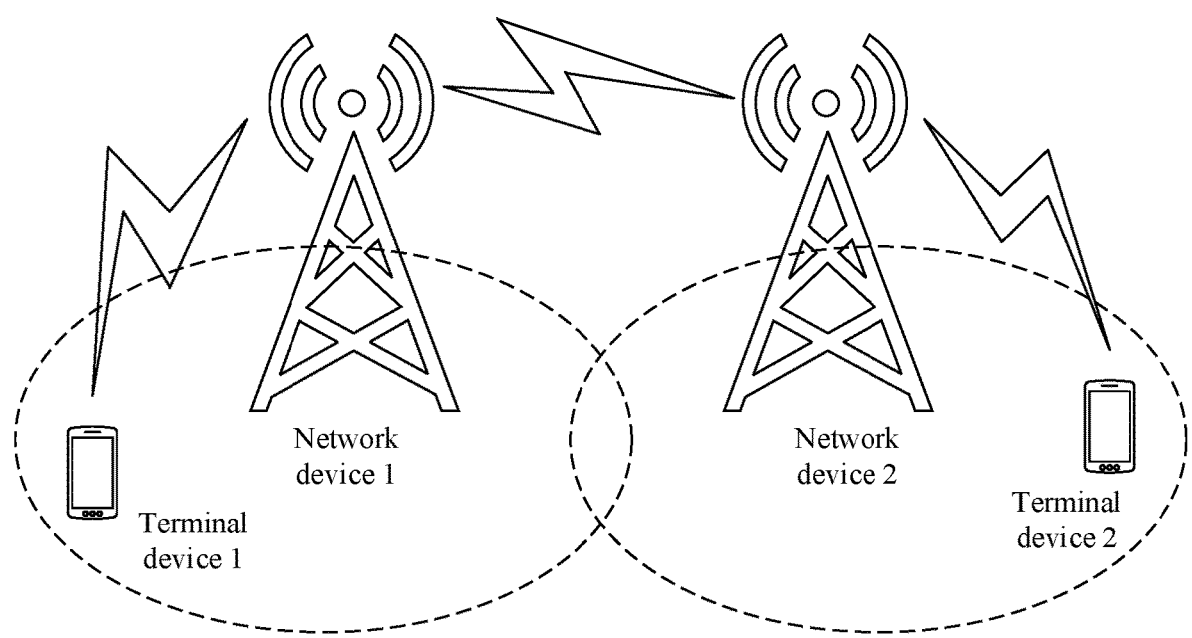
FIG. 6 is a schematic diagram of a network architecture to which embodiments of this application are applied.

FIG. 6 includes a network device 1 and a network device 2. The network device 1 serves a terminal device 1, and the network device 2 serves a terminal device 2. The network device 1 and the network device 2 may be two network devices located very far away from each other, and measurement needs to be performed between the network device 1 and the network device 2. In addition, there may be another network device and another terminal device. This is not limited in this embodiment of this application. In addition, this embodiment of this application may also be applied to measurement between network devices located close to each other. Therefore, the network device 1 and the network device 2 may alternatively be two network devices located close to each other.

A network device in FIG. 6 is, for example, an access network (access network, AN) device, for example, a base station.

The following describes, with reference to the accompanying drawings, the technical solutions provided in the embodiments of this application.

Figure 7:
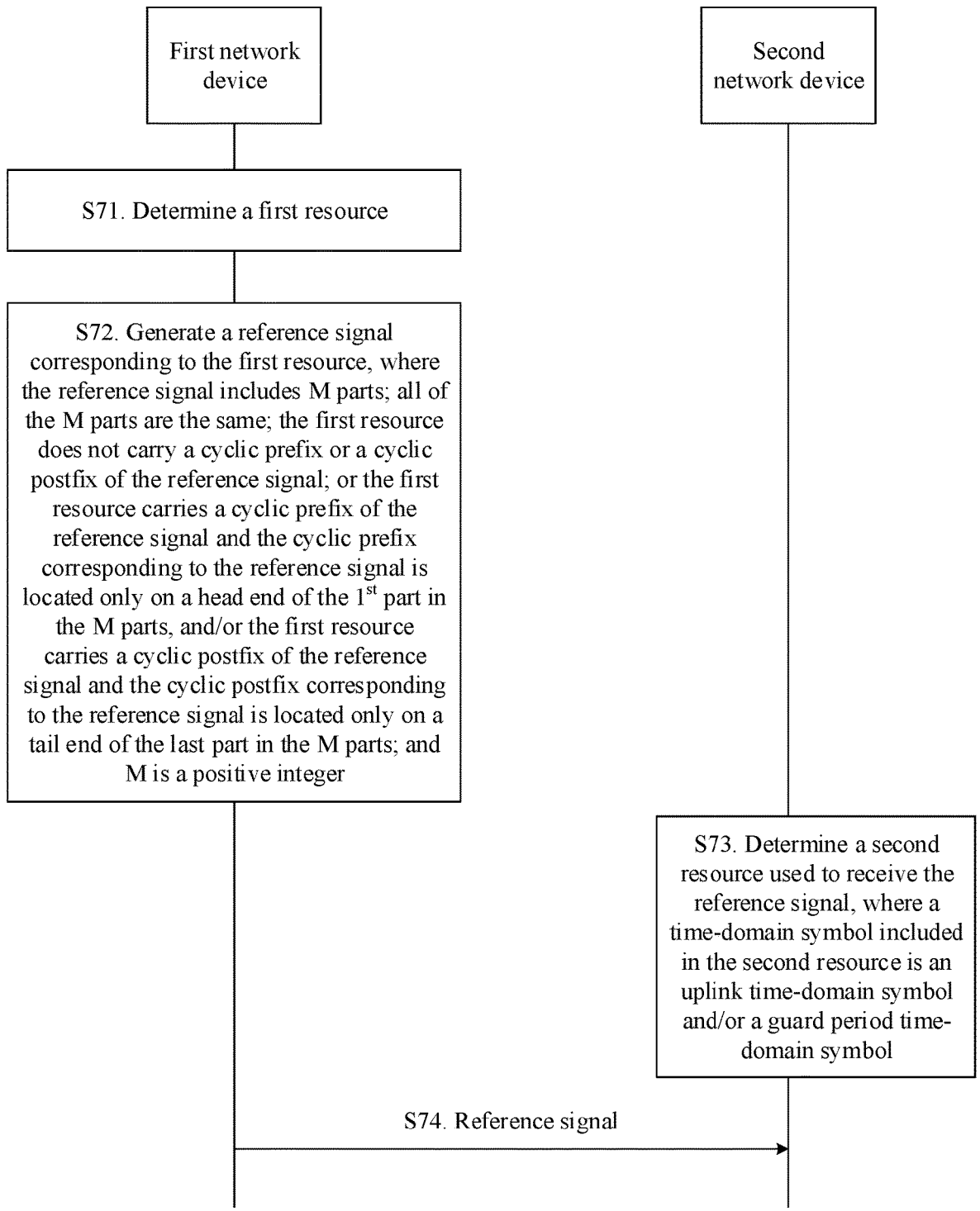
FIG. 7 is a flowchart of a reference signal sending and receiving method according to an embodiment of this application.

An embodiment of this application provides a reference signal sending and receiving method. FIG. 7 is a flowchart of the method. In the following description process, an example in which the method is applied to the network architecture shown in FIG. 6 is used. In addition, the method may be performed by two communications apparatuses. The two communications apparatuses are, for example, a first communications apparatus and a second communications apparatus. The first communications apparatus may be a network device or a communications apparatus that can support the network device in implementing a function required in the method. Certainly, the first communications apparatus may alternatively be another communications apparatus, for example, a chip system. The second communications apparatus is similar. The second communications apparatus may be a network device or a communications apparatus that can support a network device in implementing a function required in the method. Certainly, the second communications apparatus may alternatively be another communications apparatus, for example, a chip system. In addition, implementations of the first communications apparatus and the second communications apparatus are not limited. For example, both the first communications apparatus and the second communications apparatus are network devices, or the first communications apparatus is a network device, and the second communications apparatus is a communications apparatus that can support the network device in implementing a function required in the method. The network device is, for example, a base station.

For ease of description, the following uses an example in which the method is performed by a first network device and a second network device. In other words, an example in which the first communications apparatus is the first network device and the second communications apparatus is the second network device is used. For example, the first network device is the network device 1 in the network architecture shown in FIG. 6, and the second network device is the network device 2 in the network architecture shown in FIG. 6. Alternatively, the first network device is the network device 2 in the network architecture shown in FIG. 6, and the second network device is the network device 1 in the network architecture shown in FIG. 6.

S71. The first network device determines a first resource.

To generate a reference signal, the first network device first needs to determine a resource used to transmit the reference signal. For example, the resource used to transmit the reference signal is predefined by using a protocol, or is preconfigured. In this case, the first network device may directly determine the resource used to transmit the reference signal. For example, the resource that is determined by the first network device and that is used to transmit the reference signal is the first resource.

For example, the first resource may include N time-domain symbols, the N time-domain symbols are consecutive time-domain symbols, and N is a positive integer. A time-domain symbol is a unit in time domain. For example, a time-domain symbol is an OFDM symbol. In this embodiment of this application, the N time-domain symbols are consecutive symbols, and "consecutive" may be understood as that the N time-domain symbols are adjacent in a start-to-end manner.

S72. The first network device generates the reference signal corresponding to the first resource, where the reference signal includes M parts; all of the M parts are the same; the first resource does not carry a cyclic prefix of the reference signal or a cyclic postfix of the reference signal; or the first resource carries a cyclic prefix of the reference signal and the cyclic prefix corresponding to the reference signal is located only at the start of the 1$^{st}$ part in the M parts, and/or the first resource carries a cyclic postfix of the reference signal and the cyclic postfix corresponding to the reference signal is located only at the end of the last part in the M parts; and M is a positive integer. The M parts are M parts in time domain.

In this embodiment of this application, there may be different understandings of the reference signal carried on the N time-domain symbols In a first understanding, the N time-domain symbols carry one complete reference signal. In other words, the M parts (and the cyclic prefix and/or the cyclic postfix that are/is possibly included) form one complete reference signal, and the N time-domain symbols carry one complete reference signal. Based on such an understanding, it may be considered that the first network device directly generates the complete reference signal carried on the N time-domain symbols.

In a second understanding, each of the M parts is one independent reference signal, and the N time-domain symbols carry M reference signals. Based on such an understanding, S72 may also be changed to: Generate M reference signals corresponding to the first resource, where all of the M reference signals are the same; the first resource does not carry a cyclic prefix corresponding to the reference signal or a cyclic postfix corresponding to the reference signal; or the first resource carries a cyclic prefix and the cyclic prefix is located only at the start of the 1$^{st}$ reference signal in the M reference signals, and/or the first resource carries a cyclic postfix and the cyclic postfix is located only at the end of the last reference signal in the M reference signals; and M is a positive integer. Based on such an understanding, it may be considered that the first network device generates the M reference signals, or it may be considered that the first network device generates one reference signal and repeats the reference signal for M times, to obtain the M reference signals carried on the N time-domain symbols.

In order that the second network device can perform blind detection on the reference signal through low-complexity frequency-domain correlation detection, the reference signal provided in this embodiment of this application needs to meet some conditions. The foregoing several paragraphs have briefly described a characteristic that the reference signal has after the reference signal meets these conditions. The following starts from the conditions needing to be met, to describe how to enable the reference signal to meet these conditions. First, the following two conditions need to be met:

(1) The sent reference signal includes M parts. Based on the first understanding, all of the M parts are the same. Based on the second understanding, the M parts actually are M reference signals, and all of the M reference signals are the same.

(2) A CP is added to the reference signal carried on the N time-domain symbols, and a special adding manner is used. Based on the first understanding, one reference signal carried on the N time-domain symbols needs to independently meet a circularity characteristic. Based on the second understanding, the M reference signals need to meet a circularity characteristic.

The following separately describes how to meet the foregoing two conditions. In the following description process, for example, the first understanding is used for description. If the second understanding is used, an implementation may be deduced by analogy.

1. For the first condition, the sent reference signal includes the M parts, and all of the M parts are the same.

In this embodiment of this application, the reference signal may be any known signal. Optionally, to reduce a standardization workload and reduce implementation complexity of a network device, a reference signal used for measurement between network devices, namely, the reference signal in this embodiment of this application, may be designed based on a signal that can be sent by an existing network device and that is based on a pseudo-random sequence.

A possible method is to determine the reference signal according to a method using a pseudo-random sequence+constellation modulation. For example, the reference signal in this embodiment of this application may be generated by using a Gold sequence+QPSK modulation. QPSK is one type of constellation modulation, and is used to map a binary sequence of 0 and 1 to a complex-valued symbol. A specific element in a sequence depends on an initial phase $C_{init}$ of the element. In an existing NR standard, a calculation formula of $C_{init}$ is formula 1 described above.

It can be learned that when the reference signal is used for measurement between network devices, to enable all of the M parts to be the same, if a generation manner using a pseudo-random sequence+constellation modulation is reused, each of the M parts may be enabled to have a same initial phase, to enable all of the M parts to be the same. Certainly, this manner is merely one manner of enabling all of the M parts to be the same. This embodiment of this application is not limited thereto, and another manner may be used to enable all of the M parts to be the same. This embodiment mainly uses an example in which each of the M parts is enabled to have the same initial phase to enable all of the M parts to be the same.

To enable each of the M parts to have the same initial phase, in this embodiment of this application, the initial phase $C_{init}$ of each of the M parts may be determined based on time-domain information of the first resource. In other words, the initial phase of each of the M parts is determined based on the time-domain information of the first resource, so that the initial phases of all of the M parts are the same. The time-domain information of the first resource is, for example, a time-domain location of the first resource, or may be other information such as a time-domain length. In this embodiment, description is provided mainly by using an example in which the time-domain information of the first resource is the time-domain location of the first resource.

Figure 8A:
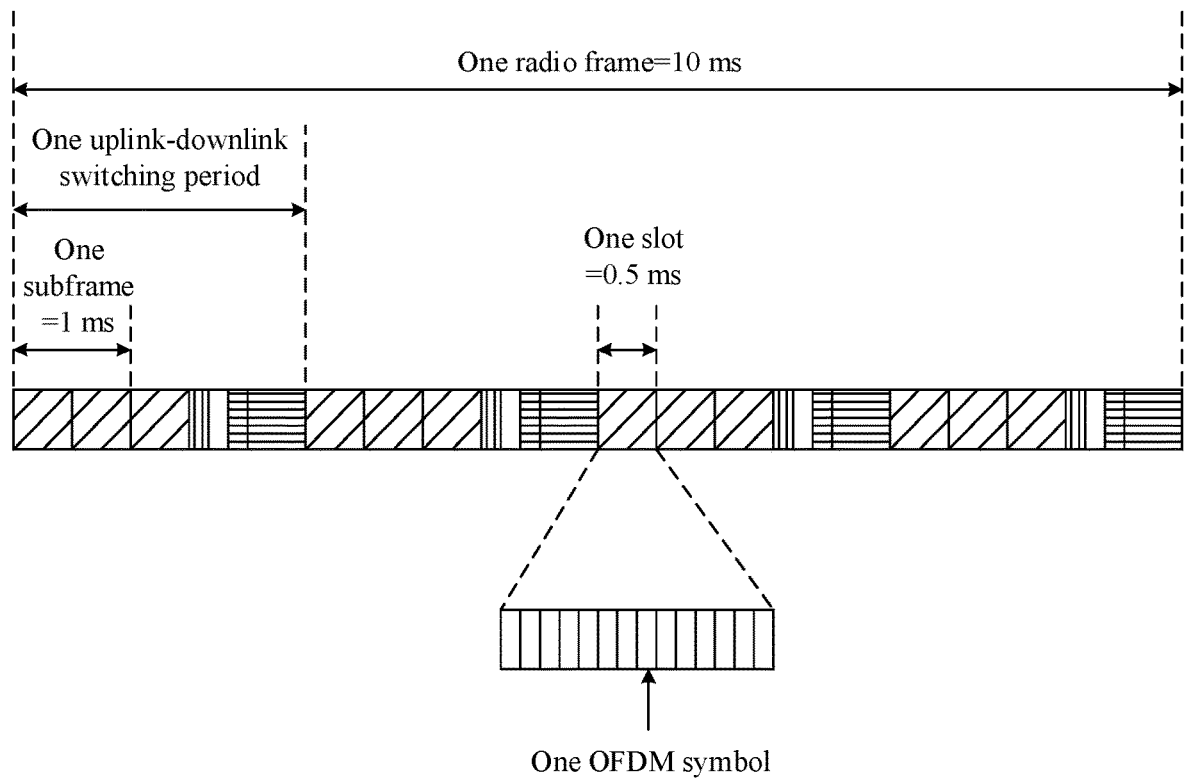
FIG. 8A is a schematic diagram of explanations of a radio frame, an uplink-downlink switching period, a subframe, a slot, and a symbol according to an embodiment of this application.

For ease of understanding, FIG. 8A shows a relationship among time-domain concepts such as a radio frame, a subframe, a slot, an uplink-downlink switching period, and a time-domain symbol. It is assumed that a subcarrier spacing is 30 kHz, the uplink-downlink switching period is 2.5 ms, and the reference signal is sent on the last N symbols in each uplink-downlink switching period in the radio frame. In FIG. 8A, slashed boxes represent time-domain symbols used for downlink transmission, boxes filled with vertical lines represent time-domain symbols used to transmit the reference signal, boxes filled with horizontal lines represent time-domain symbols used for uplink transmission, and blank boxes represent guard periods.

In a first manner of determining the initial phase $C_{init}$ of each of the M parts based on the time-domain information of the first resource, the initial phase $C_{init}$ of each of the M parts may be determined based on a slot in which the first resource is located or a slot included in the first resource. A time-domain size relationship between the first resource and the slot may be: The first resource is larger than one slot, and in this case, the first resource may include a plurality of slots, but the initial phase $C_{init}$ of each of the M parts may be determined based on the $1^{st}$ slot (or the last slot) in the plurality of slots; or the first resource may be smaller than one slot, and in this case, the first resource is completely included in a slot, and the initial phase $C_{init}$ of each of the M parts may be determined based on the slot. As described in this specification, both "the slot in which the first resource is located" and "the slot included in the first resource" are subject to the foregoing relationship. For example, the initial phase $C_{init}$ may be determined according to the following formula:

$$C_{init}=(2^{10}\cdot(n_{s,f}^{\mu}+1)\cdot(2n_{ID}+1)+n_{ID}) \bmod 2^{31} \quad \text{(formula 2)}.$$

$n_{s,f}^{\mu}$ represents a slot number, of the slot in which the first resource is located, in a radio frame, or a slot number in a radio frame period, and $n_{ID}$ is a scrambling code ID determined by a higher-layer parameter. One radio frame period generally includes 1024 radio frames, and a radio frame may also be briefly referred to as a frame. Therefore, according to the foregoing formula 2, the initial phase corresponding to the reference signal may be determined based on the slot in which the first resource is located or the slot included in the first resource. Furthermore, if the first resource overlaps with a plurality of slots, optionally, the initial phase may be determined based on one of the plurality of slots that overlap with the first resource. For example, the initial phase is determined based on the $1^{st}$ slot in the plurality of slots that overlap with the first resource, or the initial phase is determined based on the last slot in the plurality of slots that overlap with the first resource. In another optional manner of the time-domain information of the first resource, the slot used to determine the initial phase of each part may alternatively be a slot that is related to the first resource but that does not overlap with the first resource, for example, may be the $1^{st}$ slot in a radio frame in which the first resource is located, or the last slot in the radio frame in which the first resource is located. It should be noted that the foregoing formula 2 is merely an implementation of determining the initial phase based on the slot in which the first resource is located. A specific form of the formula is not limited in this embodiment of this application.

In a second manner of determining the initial phase $C_{init}$ of each of the M parts based on the time-domain information of the first resource, the initial phase $C_{init}$ of each of the M parts may be determined based on a subframe in which the first resource is located or a subframe included in the first resource. A time-domain size relationship between the first resource and the subframe may be: The first resource is larger than one subframe, and in this case, the first resource may include a plurality of subframes, and the initial phase $C_{init}$ of each of the M parts may be determined based on the $1^{st}$ subframe (or the last subframe) in the plurality of subframes; or the first resource may be smaller than one subframe, and in this case, the first resource is completely included in a subframe, and the initial phase $C_{init}$ of each of the M parts may be determined based on the subframe. As described in this specification, both "the subframe in which the first resource is located" and "the subframe included in the first resource" are subject to the foregoing relationship. For example, the initial phase $C_{init}$ may be determined according to the following formula:

$$C_{init}=(2^{10}\cdot(n_{sub,f}^{\mu}+1)\cdot(2n_{ID}+1)+n_{ID}) \bmod 2^{31} \quad \text{(formula 3)}.$$

$n_{sub,f}^{\mu}$ represents a subframe number, of the subframe in which the first resource is located, in a radio frame, or a subframe number in a radio frame period, and $n_{ID}$ is a scrambling code ID determined by a higher-layer parameter. Therefore, according to the foregoing formula 3, the initial phase corresponding to the reference signal may be determined based on the subframe in which the first resource is located or the subframe included in the first resource. Furthermore, if the first resource overlaps with a plurality of subframes, optionally, the initial phase may be determined based on one of the plurality of subframes that overlap with the first resource. For example, the initial phase is determined based on the 1st subframe in the plurality of subframes that overlap with the first resource, or the initial phase is determined based on the last subframe in the plurality of subframes that overlap with the first resource. In another optional manner of the time-domain information of the first resource, the subframe used to determine the initial phase of each part may alternatively be a subframe that is related to the first resource but that does not overlap with the first resource, for example, may be the $1^{st}$ subframe in a radio frame in which the first resource is located, or the last subframe in the radio frame in which the first resource is located. It should be noted that the foregoing formula 3 is merely an implementation of determining the initial phase based on the subframe in which the first resource is located. A specific form of the formula is not limited in this embodiment of this application.

In a third manner of determining the initial phase $C_{init}$ of each of the M parts based on the time-domain information of the first resource, the initial phase $C_{init}$ of each of the M parts may be determined based on an uplink-downlink switching period in which the first resource is located. For example, the initial phase $C_{init}$ may be determined according to the following formula:

$$C_{init}=(2^{10} \cdot (n_{p,f}^{\mu}+1) \cdot (2n_{ID}+1)+n_{ID}) \bmod 2^{31} \qquad \text{(formula 4)}.$$

$n_{p,f}^{\mu}$ represents a sequence number, of the uplink-downlink switching period in which the first resource is located, in a radio frame, or a sequence number in a radio frame period, and $n_{ID}$ is a scrambling code ID determined by a higher-layer parameter. Therefore, according to the foregoing formula 4, the initial phase corresponding to the reference signal may be determined based on the uplink-downlink switching period in which the first resource is located. In another optional manner of the time-domain information of the first resource, the uplink-downlink switching period used to determine the initial phase of each part may alternatively be an uplink-downlink switching period that is related to the first resource but that does not include the first resource, for example, may be the $1^{st}$ uplink-downlink switching period in a radio frame in which the first resource is located, or the last uplink-downlink switching period in the radio frame in which the first resource is located. It should be noted that the foregoing formula 4 is merely an implementation of determining the initial phase based on the uplink-downlink switching period in which the first resource is located. A specific form of the formula is not limited in this embodiment of this application.

In a fourth manner of determining the initial phase $C_{init}$ of each of the M parts based on the time-domain information of the first resource, the initial phase $C_{init}$ of each of the M parts may be determined based on a radio frame in which the first resource is located. For example, the initial phase $C_{init}$ may be determined according to the following formula:

$$C_{init}(2^{10} \cdot (SFN+1) \cdot (2n_{ID}+1)+n_{ID}) \bmod 2^{31} \qquad \text{(formula 5)}.$$

SFN represents a radio frame number, of the radio frame in which the first resource is located, in a radio frame period, and $n_{ID}$ is a scrambling code ID determined by a higher-layer parameter. Therefore, according to the foregoing formula 5, the initial phase corresponding to the reference signal may be determined based on the radio frame in which the first resource is located. It should be noted that the foregoing formula 5 is merely an implementation of determining the initial phase based on the radio frame in which the first resource is located. A specific form of the formula is not limited in this embodiment of this application.

In a fifth manner of determining the initial phase $C_{init}$ of each of the M parts based on the time-domain information of the first resource, the initial phase $C_{init}$ of each of the M parts may be determined based on the time-domain symbol included in the first resource. For example, the initial phase may be determined by using the foregoing formula 1. For ease of reading, the formula is repeated as follows:

$$C_{init}=(2^{10} \cdot (14n_{s,f}^{\mu}+l+1) \cdot (2n_{ID}+1)+n_{ID}) \bmod 2^{31} \qquad \text{(formula 1)}.$$

l (l, L in lower case) represents a symbol number of a first time-domain symbol in a slot, $n_{s,f}^{\mu}$ represents a slot number, of the slot in which the first time-domain symbol is located, in a radio frame, and $n_{ID}$ is a scrambling code ID determined by a higher-layer parameter. The first time-domain symbol is, for example, a predefined time-domain symbol, and selection of the first time-domain symbol includes but is not limited to the following manners:

Manner 1: The first time-domain symbol is the $1^{st}$ time-domain symbol in the N time-domain symbols. It should be noted herein that the $1^{st}$ time-domain symbol in the N time-domain symbols may also be referred to as a start time-domain symbol in the N time-domain symbols. In addition, "the first time-domain symbol" and "the $1^{st}$ time-domain symbol" are different concepts. "The $1^{st}$ time-domain symbol" is a concept in terms of time, and is the 1st one in the N time-domain symbols. "The first time-domain symbol" refers only to one time-domain symbol, and the time-domain symbol may be "the $1^{st}$ time-domain symbol" in the N time-domain symbols, or may be another time-domain symbol.

Manner 2: The first time-domain symbol is the last time-domain symbol in the N time-domain symbols. It should be noted herein that the last time-domain symbol in the N time-domain symbols may also be referred to as a end time-domain symbol in the N time-domain symbols.

Manner 3: The first time-domain symbol is a time-domain symbol other than the $1^{st}$ time-domain symbol and the last time-domain symbol in the N time-domain symbols. For example, the first time-domain symbol may be a $$\left\lfloor \frac{N}{2} \right\rfloor$$

symbol in the N time-domain symbols, where $\lfloor x \rfloor$ indicates rounding down x.

Manner 4: The first time-domain symbol is a time-domain symbol other than the N time-domain symbols. For example, the first time-domain symbol may be the $1^{st}$ time-domain symbol in a radio frame in which the first resource is located.

Therefore, according to the foregoing formula 1, the initial phase corresponding to the reference signal may be determined based on the first time-domain symbol. It should be noted that the foregoing several manners are merely examples. How to select the first time-domain symbol is not limited in this embodiment of this application.

The foregoing manner 1 to manner 4 may be separately used, or may be combined for use. For example, the initial phase $C_{init}$ may be jointly determined based on one or more of the radio frame number, the subframe number, the slot number, the symbol number, and the sequence number of the uplink-downlink switching period. For example, according to formula 1, it may be considered as that the initial phase is determined based on both the symbol number of the first time-domain symbol and the slot number of the slot in which the first time-domain symbol is located. For another example, the initial phase may be determined according to the following formula 6:

$$C_{init}=(2^{10} \cdot (2^{\mu} \cdot 10 \cdot 14 \cdot SFN + 14n_{s,f}^{\mu}+l+1) \cdot (2n_{ID}+1)+n_{ID}) \bmod 2^{31} \qquad \text{(formula 6)}.$$

l represents a symbol number of the first time-domain symbol in a slot, $n_{s,f}^{\mu}$ represents a slot number, of the slot in which the first time-domain symbol is located, in a radio frame, SFN represents a radio frame number, of the radio frame in which the first time-domain symbol is located, in a radio frame period, and $n_{ID}$ is a scrambling code ID determined by a higher-layer parameter.

It should be noted that the manner of determining the initial phase of each of the M parts based on the time-domain location of the first resource is merely a manner of enabling all of the M parts to be the same. This embodiment of this application is not limited thereto, and another manner may be used to enable all of the M parts to be the same. For example, in a possible manner, a predefined or preconfigured manner is used to enable all of the M parts to be the same. For example, a value of the initial phase $C_{init}$ corresponding to each of the M parts is directly predefined, to enable all of the M parts to be the same. For another example, the initial phase $C_{init}$ is determined according to a formula related to one or more parameters of l, $n_{s,f}^\mu$, $n_{sub,f}^\mu$, $n_{p,f}^\mu$, SFN, and $n_{ID}$, and all of the parameters l, $n_{s,f}^\mu$, $n_{sub,f}^\mu$, $n_{p,f}^\mu$, SFN, and $n_{ID}$ in the formula are predefined or preconfigured values, to enable all of the M parts to be the same.

In this embodiment of this application, the reference signal may be any known signal. Optionally, to reduce a standardization workload and reduce implementation complexity of a network device, a reference signal used for measurement between network devices, namely, the reference signal in this embodiment of this application, may be designed based on a peak to average power ratio (PAPR) sequence that can be sent by an existing network device.

A possible method is to use a low-PAPR sequence based on a ZC sequence, as the reference signal. The low-PAPR sequence based on the ZC sequence may be represented by the following formula:

$$r_{u,v}^{(\alpha,\delta)}(n) = e^{j\alpha n}\bar{r}_{u,v}(n), 0 \le M_{ZC} \quad \text{(formula 7)}.$$

$\alpha$ is a cyclic shift of a base sequence (base sequence) $\bar{r}_{u,v}(n)$, and $M_{ZC} = mN_{SC}^{RB}/2^\delta$ is a sequence length. For a case (a typical case) in which the sequence length is greater than or equal to 36, the base sequence $\bar{r}_{u,v}(n)$ is defined as:

$$\bar{r}_{u,v}(n) = x_q(n \bmod N_{ZC}) \quad \text{(formula 8)}$$

$$x_q(m) = e^{-j\frac{\pi q m(m+1)}{N_{ZC}}}$$

$$q = \lfloor \bar{q} + 1/2 \rfloor + v \cdot (-1)^{\lfloor 2\bar{q} \rfloor}$$

$$\bar{q} = N_{ZC} \cdot (u+1)/31.$$

$u \in \{0, 1, \ldots, 29\}$ is a base sequence group number, and v is a base sequence number. When $\frac{1}{2} \le m/2^\delta \le 5$, $v=0$; and when $6 \le m/2^\delta$, $v=\{0,1\}$. $N_{ZC}$ is a prime number that is not greater than $M_{ZC}$.

It can be learned from the foregoing formula 7 and formula 8 that when the sequence length is determined, each specific element value of the low-PAPR sequence is jointly determined by $\alpha$, u, and v, and therefore, the reference signal that is based on the PAPR sequence is determined.

It can be learned that when the reference signal is used for measurement between network devices, to enable all of the M parts to be the same, if a generation manner using a low-PAPR sequence is used, each of the M parts may be enabled to have a same cyclic shift $\alpha$, a same base sequence group number u, and a same base sequence number v, to enable all of the M parts to be the same. Certainly, this manner is merely one manner of enabling all of the M parts to be the same. This embodiment of this application is not limited thereto, and another manner may be used to enable all of the M parts to be the same. For example, a sequence number parameter q in formula 8 is jointly determined by the base sequence group number u and the base sequence number v. Therefore, each part may be directly enabled to have a same cyclic shift $\alpha$ and a same sequence number parameter q, to enable all of the M parts to be the same. This embodiment mainly uses an example in which each of the M parts is enabled to have a same cyclic shift $\alpha$, a same base sequence group number u, and a same base sequence number v, to enable all of the M parts to be the same.

To enable each of the M parts to have a same cyclic shift $\alpha$, a same base sequence group number u, and a same base sequence number v, in this embodiment of this application, the cyclic shift $\alpha$, the base sequence group number u, and the base sequence number v of each of the M parts may be determined based on the time-domain information of the first resource. In other words, the cyclic shift $\alpha$, the base sequence group number u, and the base sequence number v of each of the M parts are determined based on the time-domain information of the first resource, to enable the initial phases of all of the M parts to be the same. The time-domain information of the first resource is, for example, the time-domain location of the first resource, or may be other information such as the time-domain length of the first resource. In this embodiment, description is provided mainly by using an example in which the time-domain information of the first resource is the time-domain location of the first resource. The time-domain location of the first resource includes, for example, at least one of the following: the slot in which the first resource is located or the slot included in the first resource, the time-domain symbol included in the first resource, the subframe in which the first resource is located or the subframe included in the first resource, the uplink-downlink switching period in which the first resource is located, and the system frame in which the first resource is located.

In a manner of determining the cyclic shift $\alpha$, the base sequence group number and the base sequence number v of each of the M parts based on the time-domain information of the first resource, the cyclic shift $\alpha$, the base sequence group number u, and the base sequence number v of each of the M parts of the reference signal may be determined according to the following formula:

$$u = (l + 14 \cdot (n_{ID} \bmod 2)) \bmod 30$$

$$v = 0$$

$$\alpha = n_{s,f}^\mu \bmod K \quad \text{(formula 9)}.$$

In the foregoing formula, 1 (l, L in lower case) represents a symbol number of a first time-domain symbol in a slot, $n_{s,f}^\mu$ represents a slot number, of the slot in which the first time-domain symbol is located, in a radio frame, $n_{ID}$ is a scrambling code ID determined by a higher-layer parameter, and K is a predefined or preconfigured value, for example, K=1. The first time-domain symbol is, for example, a predefined time-domain symbol, and selection of the first time-domain symbol includes but is not limited to the following manners:

Manner 1: The first time-domain symbol is the $1^{st}$ time-domain symbol in the N time-domain symbols. It should be noted herein that the $1^{st}$ time-domain symbol in the N time-domain symbols may also be referred to as a start time-domain symbol in the N time-domain symbols. In addition, "the first time-domain symbol" and "the $1^{st}$ time-domain symbol" are different concepts. "The $1^{st}$ time-domain symbol" is a concept in terms of time, and is the 1st one in the N time-domain symbols. "The first time-domain symbol" refers only to one time-domain symbol, and the time-domain symbol may be "the $1^{st}$ time-domain symbol" in the N time-domain symbols, or may be another time-domain symbol.

Manner 2: The first time-domain symbol is the last time-domain symbol in the N time-domain symbols. It should be noted herein that the last time-domain symbol in the N time-domain symbols may also be referred to as a end time-domain symbol in the N time-domain symbols.

Manner 3: The first time-domain symbol is a time-domain symbol other than the $1^{st}$ time-domain symbol and the last time-domain symbol in the N time-domain symbols. For example, the first time-domain symbol may be a $$\lfloor \frac{N}{2} \rfloor$$

symbol in the N time-domain symbols, where $\lfloor x \rfloor$ indicates rounding down x.

Manner 4: The first time-domain symbol is a time-domain symbol other than the N time-domain symbols. For example, the first time-domain symbol may be the $1^{st}$ time-domain symbol in a radio frame in which the first resource is located.

Therefore, according to the foregoing formula 9, the cyclic shift α, the base sequence group number u, and the base sequence number v that correspond to the reference signal may be determined based on the first time-domain symbol.

Similarly, the cyclic shift α, the base sequence group number u, and the base sequence number v may alternatively be determined based on one or more of parameters such as $l$, $n_{s,f}^{\mu}$, $n_{sub,f}^{\mu}$, $n_{p,f}^{\mu}$, SFN and $n_{ID}$ that are related to the first resource. This is not specifically limited in this embodiment of this application. However, it should be noted that a final value range of u is {0, 1, . . . , 29}. In addition, similarly, each part may be enabled, based on $l$, $n_{s,f}^{\mu}$, $b_{sub,f}^{\mu}$, $n_{p,f}^{\mu}$, SFN and $n_{ID}$ that are related to the first resource, to have the same cyclic shift α and the same sequence number parameter q, to enable all of the M parts to be the same.

It should be noted that the manner of determining the cyclic shift α, the base sequence group number u, and the base sequence number v of each of the M parts based on a time-domain downlink of the first resource is merely a manner of enabling all of the M parts to be the same. This embodiment of this application is not limited thereto, and another manner may be used to enable all of the M parts to be the same. For example, in a possible manner, a predefined or preconfigured manner is used to enable all of the M parts to be the same. For example, values of the cyclic shift α, the base sequence group number u, and the base sequence number v that correspond to each of the M parts are directly predefined, to enable all of the M parts to be the same. Alternatively, the cyclic shift α, the base sequence group number u, and the base sequence number v are determined according to a formula related to one or more parameters of $l$, $n_{s,f}^{\mu}$, $n_{sub,f}^{\mu}$, $n_{p,f}^{\mu}$, SFN and $n_{ID}$, and all of the parameters $l$, $n_{s,f}^{\mu}$, $n_{sub,f}^{\mu}$, $n_{p,f}^{\mu}$, SFN and $n_{ID}$ in the formula are predefined or preconfigured values, to enable all of the M parts to be the same. Similarly, values of the cyclic shift α and the sequence number parameter q that correspond to each of the M parts may alternatively be predefined directly, to enable all of the M parts to be the same. Alternatively, the cyclic shift α and the sequence number parameter q are determined according to a formula related to one or more parameters of $l$, $n_{s,f}^{\mu}$, $n_{sub,f}^{\mu}$, $n_{p,f}^{\mu}$, SFN and $n_{ID}$, and all of the parameters $l$, $n_{s,f}^{\mu}$, $n_{sub,f}^{\mu}$, $n_{p,f}^{\mu}$, SFN and $n_{ID}$ in the formula are predefined or preconfigured values, to enable all of the M parts to be the same.

It can be learned from formula 1 to formula 6 and formula 9 that the initial phase of the reference signal is further related to $n_{ID}$.

Then, in an optional manner, $n_{ID}$ may be used to carry an identity of a cell, for example, related information of a physical cell identity (physical cell ID, PCID). For example, $n_{ID}$ may be equal to the PCID, or there is a mapping relationship between $n_{ID}$ and the PCID. For example, $n_{ID}$ is a value of (PCID modulo M), where M is a predefined value, for example, M is less than or equal to a maximum value of the PCID. According to this method, the reference signal may be enabled to carry a part of the cell identity information, so that when obtaining the reference signal through detection, the second network device can determine that a network device sending the reference signal is the first network device. $n_m$ may alternatively be used to carry other related information of the identity of the cell, for example, an evolved universal terrestrial radio access network cell identifier (E-UTRAN cell identifier, ECI) or an evolved universal terrestrial radio access network cell global identifier (E-UTRAN cell global identifier, ECGI).

In another optional manner, $n_{ID}$ may be a predefined value. For example, the value of $n_{ID}$ may be equal to 0, or may be another predefined value. In addition, a value range of $n_m$ may be further limited, for example, limited to $n_{ID} \in \{0, 1, 2, \ldots, 7\}$. An advantage of this method is that the second network device does not need to assume a plurality of possible values of $n_m$ in a detection process, and does not need to locally perform cross-correlation detection by using a plurality of reference signals. This helps to reduce complexity of performing blind detection on the reference signal.

Certainly, $n_{ID}$ is not limited to the foregoing value obtaining manner, and no specific limitation is imposed.

All of the M parts can be enabled to be the same by using the foregoing technical means.

2. For the second condition, the cyclic prefix and/or the cyclic postfix are/is added to the reference signal carried on the N time-domain symbols, and a special adding manner is used, so that the reference signal carried on the N time-domain symbols meets a circularity characteristic.

Figure 8B:
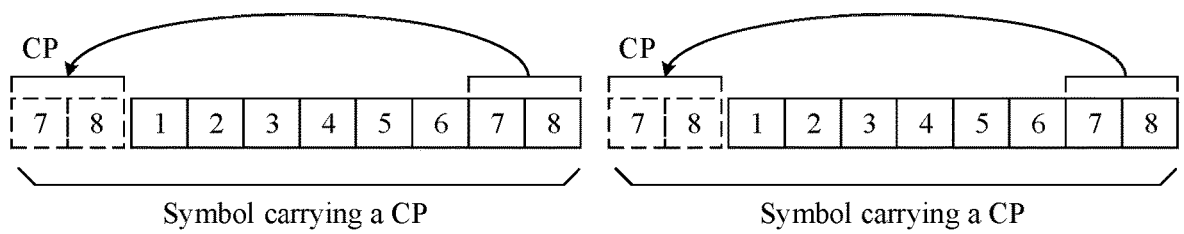
FIG. 8B is a schematic diagram of an existing manner of adding a CP.

In an existing CP adding manner, a CP is added to each time-domain symbol. Adding a CP is equivalent to adding the last several sampling points in a time-domain symbol to a front end of the time-domain symbol. For this, refer to FIG. 8B. FIG. 8B includes two time-domain symbols. Each square represents several sampling points. Alternatively, for simplicity, it may be considered that each square represents one sampling point, sampling points corresponding to square 7 and square 8 are used as a CP and added to a start of a time-domain symbol, and CPs are respectively added to the two time-domain symbols. In this CP adding manner, even if two consecutive time-domain symbols carry a same reference signal, a sequence 78-12345678-78-12345678 obtained after the CPs are added does not have a circularity characteristic. As a reference, a sequence similar to 12345678-12345678 is circular.

Considering this problem, a new manner of adding a CP is designed in this embodiment of this application. In this embodiment of this application, when a CP is added, the CP is not included between the M parts, and the CP may be added to a start of the M parts and/or the CP may be added to a end of the M parts. Alternatively, no CP may be added. The start of the M parts may also be understood as a start of the $1^{st}$ part in the M parts, and the CP added to the start of the M parts may also be referred to as a cyclic prefix. The end of the M parts may also be understood as a end of the last part in the M parts, and the CP added to the end of the M parts may also be referred to as a cyclic postfix (cyclic postfix, CP).

To be specific, a CP processing manner includes but is not limited to the following several manners:

Manner 1: The cyclic prefix is added only to the start of the $1^{st}$ part in the M parts.

Herein, "adding the cyclic prefix only to the start of the $1^{st}$ part in the M parts" may be understood as that the cyclic prefix is added only to the start of the $1^{st}$ part in the M parts, and for the other part in the M parts, no cyclic prefix is added to a start of the part. In addition, it may also be understood as that the cyclic prefix is added only to the start of the $1^{st}$ part in the M parts, and no CP is added to any other location. In other words, the first resource carries only the cyclic prefix added to the start of the $1^{st}$ part in the M parts, and does not carry any other CP.

Figure 9:
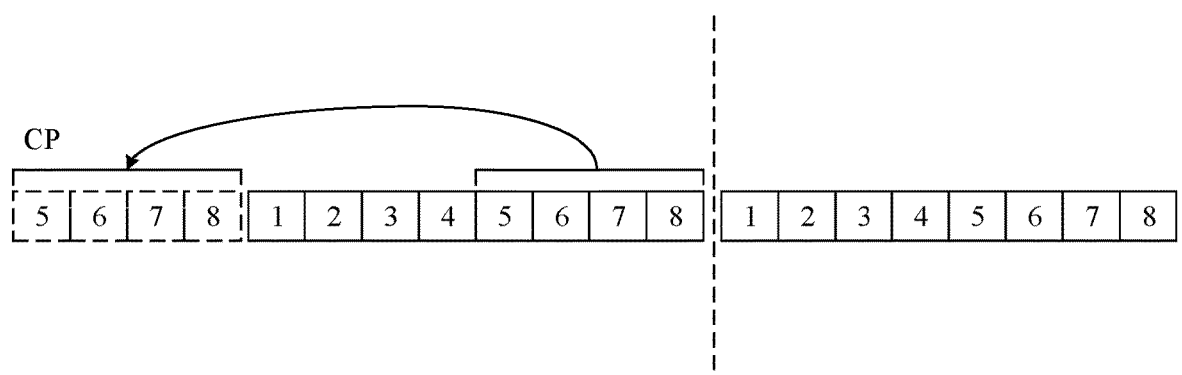
FIG. 9 is a schematic diagram of a first manner of adding a CP according to an embodiment of this application.

FIG. 9 shows an example in which the CP is added only to the start of the M parts. In FIG. 9, that N=2 and M=2 is used as an example. It can be learned that square 5 to square 8 included in the $1^{st}$ part in the M parts are used as a CP and added to a start of the $1^{st}$ part, namely, the start of the $1^{st}$ part in the M parts, and no CP is added to any other location. In addition, because square 1 to square 8 in the $1^{st}$ part are the same as square 1 to square 8 in the $2^{nd}$ part, it may also be considered that square 5 to square 8 included in the $2^{nd}$ part are used as a CP and added to the start of the $1^{st}$ part.

In addition, if reference signals included in the N time-domain symbols of the first resource are understood as M same reference signals, manner 1 may also be understood as that L sampling points included in the reference signal are added one by one in a back-to-front sequence starting from the end of the N time-domain symbols, after the $1^{st}$ sampling point included in the reference signal is added, the reference signal is added again starting from the last sampling point. This process is repeated until the start of the N time-domain symbols carries the reference signal. In this case, if each time-domain symbol includes L sampling points, and each reference signal includes K sampling points, the N time-domain symbols include a maximum of $$\left\lfloor \frac{NL}{K} \right\rfloor$$

complete reference signals $$\left( M = \left\lfloor \frac{NL}{K} \right\rfloor \right),$$

and the start of the N time-domain symbols includes a maximum of the last NL % K sampling points of the reference signal, where x % y represents a remainder obtained after x is divided by y.

Manner 2: The cyclic postfix is added only to the end of the last part in the M parts. The end of the last part in the M parts may also be understood as the end of the M parts. In other words, the first resource carries only the cyclic postfix added to the end of the last part in the M parts, and does not carry any other CP.

Herein, "adding the cyclic postfix only to the end of the last part in the M parts" may be understood as that the cyclic postfix is added only to the end of the last part in the M parts, and for the other part in the M parts, no cyclic postfix is added to a end of the part. In addition, it may also be understood as that the cyclic postfix is added only to the end of the last part in the M parts, and no CP is added to any other location. In other words, the first resource carries only the cyclic postfix added to the end of the last part in the M parts, and does not carry any other CP.

Figure 10:
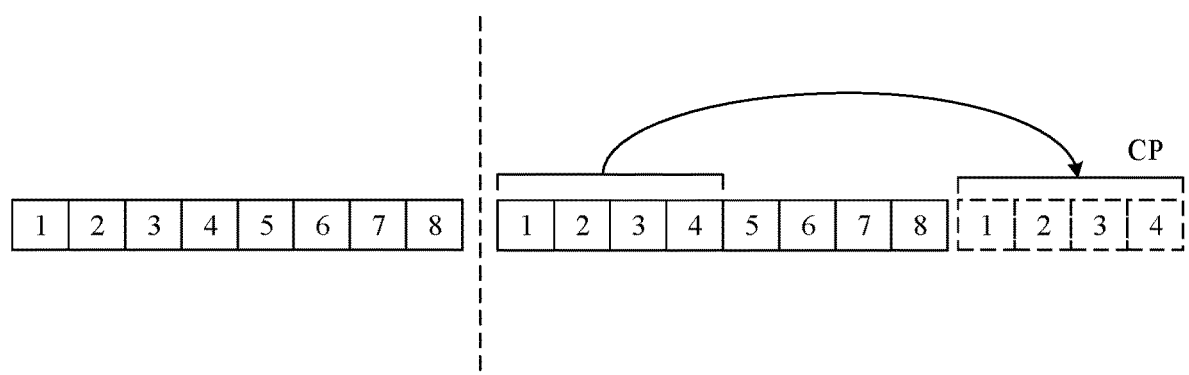
FIG. 10 is a schematic diagram of a second manner of adding a CP according to an embodiment of this application.

FIG. 10 shows an example in which the CP is added only to the end of the M parts. In FIG. 10, that N=2 and M=2 is used as an example. It can be learned that square 1 to square 4 included in the $2^{nd}$ part in the M parts are used as a CP and added to a end of the $2^{nd}$ part, namely, the end of the last part in the M parts, and no CP is added to any other location. In addition, because square 1 to square 8 in the $1^{st}$ part are the same as square 1 to square 8 in the 2nd part, it may also be considered that square 1 to square 4 included in the $1^{st}$ part are used as the CP and added to the end of the 2nd part.

In addition, if reference signals included in the N time-domain symbols of the first resource are understood as M same reference signals, manner 2 may also be understood as that L sampling points included in the reference signal are added one by one in a front-to-back sequence starting from the start of the N time-domain symbols, after the last sampling point included in the reference signal is added, the reference signal is added again starting from the $1^{st}$ sampling point. This process is repeated until the end of the N time-domain symbols carries the reference signal. In this case, if each time-domain symbol includes L sampling points, and each reference signal includes K sampling points, the N time-domain symbols include a maximum of $$\left\lfloor \frac{NL}{K} \right\rfloor$$

complete reference signals $$\left( M = \left\lfloor \frac{NL}{K} \right\rfloor \right),$$

and the end of the N time-domain symbols includes a maximum of the first NL % K sampling points of the reference signal.

Manner 3: The cyclic prefix is added only to the start of the $1^{st}$ part in the M parts, and the cyclic postfix is added only to the end of the last part in the M parts. In other words, the first resource carries only the cyclic prefix added to the start of the $1^{st}$ part in the M parts and the cyclic postfix added to the end of the last part in the M parts, and does not carry any other CP.

Herein, "adding the cyclic prefix only to the start of the $1^{st}$ part in the M parts" may be understood as that the cyclic prefix is added only to the start of the $1^{st}$ part in the M parts, and for the other part in the M parts, no cyclic prefix is added to a start of the part. Similarly, "adding the cyclic postfix only to the end of the last part in the M parts" may be understood as that the cyclic postfix is added only to the end of the last part in the M parts, and for the other part in the M parts, no cyclic postfix is added to the end of the part.

Figure 11A:
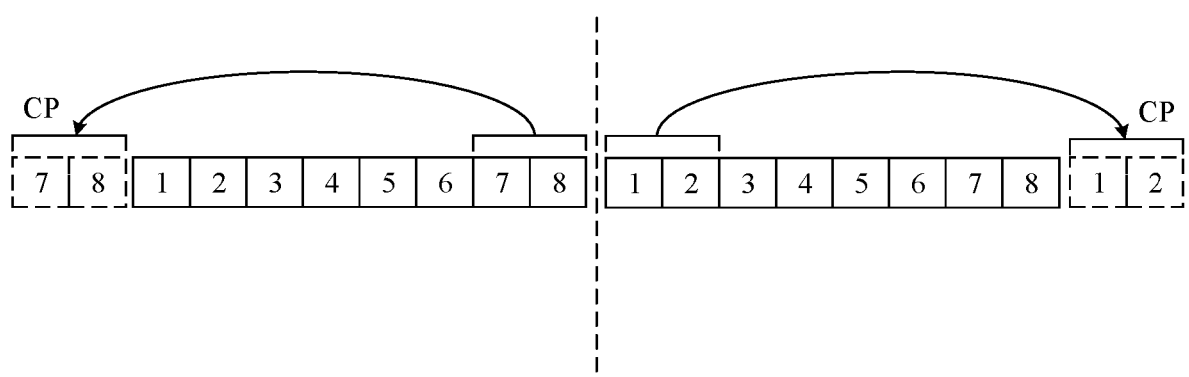
FIG. 11A is a first schematic diagram of a third manner of adding a CP according to an embodiment of this application.

FIG. 11A shows only an example in which the cyclic prefix is added only to the start of the $1^{st}$ part in the M parts, and the cyclic postfix is added only to the end of the last part in the M parts. In FIG. 11A, that N=2 and M=2 is used as an example. It can be learned that square 7 and square 8 included in the $1^{st}$ part in the M parts are used as a CP and added to a start of the $1^{st}$ part in the M parts, namely, the start of the $1^{st}$ part in the M parts, square 1 and square 2 included in the 2nd part in the M parts are used as a CP and added to the end of the 2nd part, namely, the end of the last part in the M parts, and no CP is added to any other location. In addition, because square 1 to square 8 in the 1$^{st}$ part are the same as square 1 to square 8 in the 2nd part, it may also be considered that square 1 and square 2 included in the 1$^{st}$ part are used as a CP and added to the end of the 2nd part, and it may be considered that square 7 and square 8 included in the 2nd part are used as a CP and added to the header of the 1$^{st}$ part.

Figure 11B:
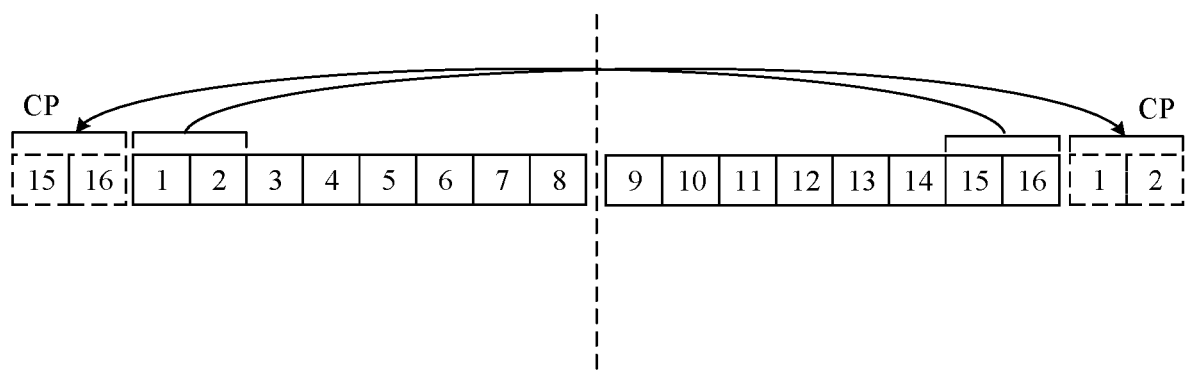
FIG. 11B is a second schematic diagram of a third manner of adding a CP according to an embodiment of this application.

FIG. 11B shows only an example in which the cyclic prefix is added only to the start of the 1$^{st}$ part in the M parts, and the cyclic postfix is added only to the end of the last part in the M parts. In FIG. 11B, that N=2 and M=1 is used as an example. It can be learned that the reference signal includes only one part, and square 15 and square 16 included in the part are used as a CP and added to a start of the part, and square 1 and square 2 included in the part are used as a CP and added to the end of the part.

Figure 12A:
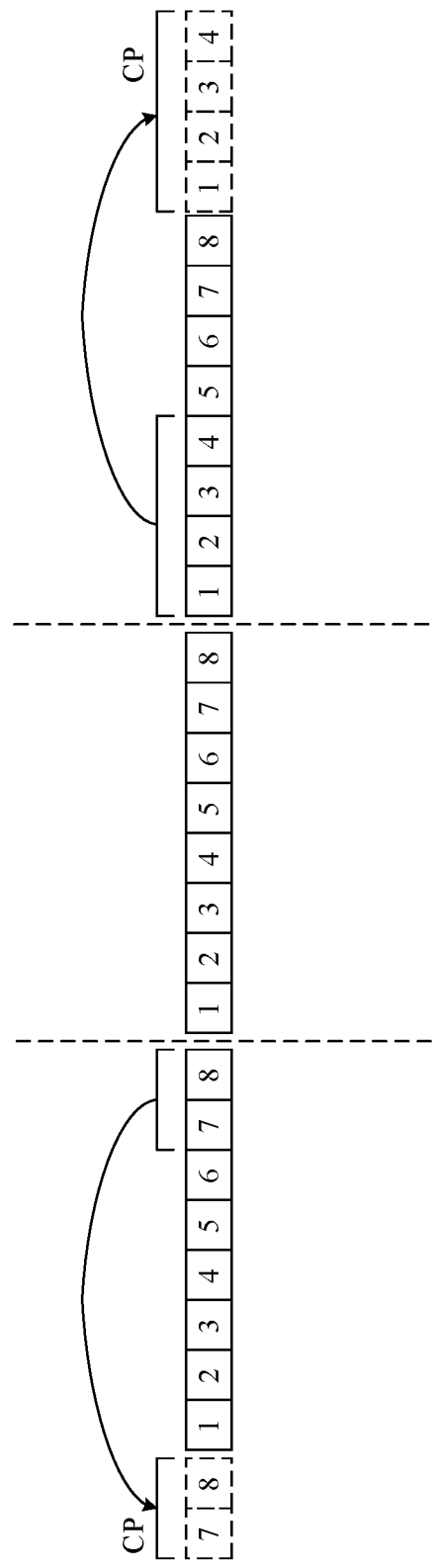
FIG. 12A is a third schematic diagram of a third manner of adding a CP according to an embodiment of this application.

FIG. 12A shows another example in which the cyclic prefix is added only to the start of the 1$^{st}$ part in the M parts, and the cyclic postfix is added only to the end of the last part in the M parts. In FIG. 12A, that N=3 and M=3 is used as an example. It can be learned that square 7 and square 8 included in the 1$^{st}$ part in the M parts are used as a CP and added to a start of the 1$^{st}$ part in the M parts, namely, the start of the 1$^{st}$ part in the M parts, square 1 to square 4 included in the 3rd part in the M parts are used as a CP and added to the end of the third part, namely, the end of the last part in the M parts, and no CP is added to any other location. In addition, because square 1 to square 8 in the 1$^{st}$ part, the 2nd part, and the 3rd part are the same, it may also be considered that square 1 to square 4 included in the 1$^{st}$ part are used as a CP and added to the end of the 3$^{rd}$ part, and it may be considered that square 7 and square 8 included in the 3$^{rd}$ part are used as a CP and added to the start of the 1$^{st}$ part.

Figure 12B:
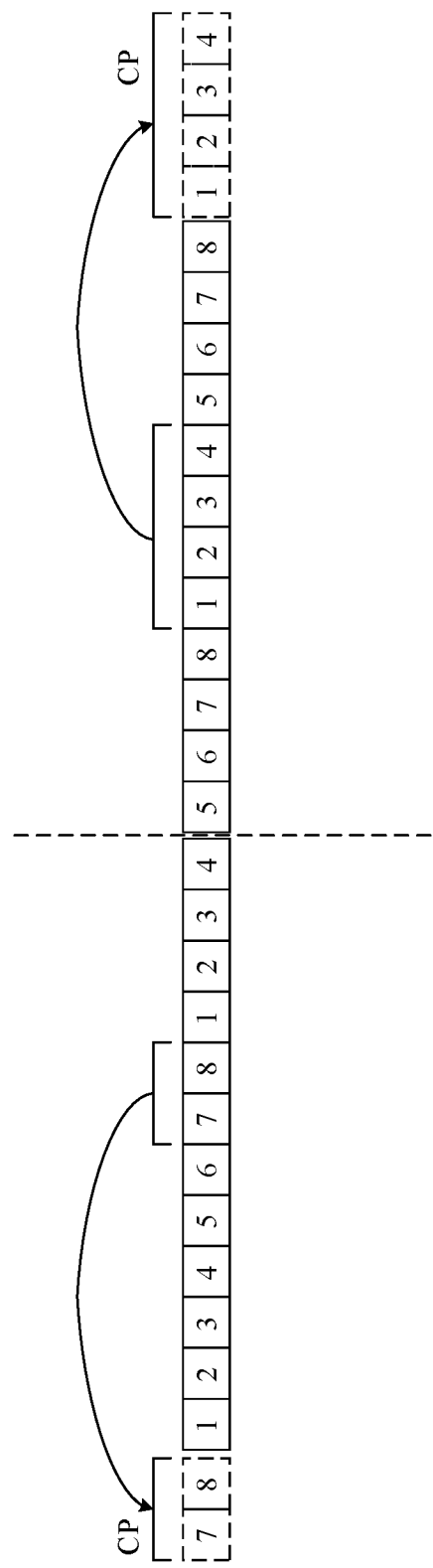
FIG. 12B is a fourth schematic diagram of a third manner of adding a CP according to an embodiment of this application.

FIG. 12B shows another example in which the cyclic prefix is added only to the start of the 1$^{st}$ part in the M parts, and the cyclic postfix is added only to the end of the last part in the M parts. In FIG. 12B, that N=2 and M=3 is used as an example. Every group of square 1 to square 8 is one part. It can be learned that square 7 and square 8 included in the 1$^{st}$ part in the M parts are used as a CP and added to a start of the 1$^{st}$ part in the M parts, namely, the start of the 1$^{st}$ part in the M parts, square 1 to square 4 included in the 3$^{rd}$ part in the M parts are used as a CP and added to a the end of the 3$^{rd}$ part, namely, the end of the last part in the M parts, and no CP is added to any other location. In addition, because squares 1 to squares 8 in the 1st part, the 2nd part, and the 3$^{rd}$ part are the same, it may also be considered that square 1 to square 4 included in the 1$^{st}$ part are used as a CP and added to the end of the 3$^{rd}$ part, and it may be considered that square 7 and square 8 included in the 3$^{rd}$ part are used as a CP and added to the start of the 1$^{st}$ part.

Manner 4: No CP is added. In other words, the first resource does not carry the cyclic prefix of the reference signal or the cyclic postfix of the reference signal.

In this manner, no CP is added to a start or a end of each of the M parts, and no CP is added between the M parts either. This manner may also be understood as that in the M parts, a part is a cyclic prefix of a part following the part, or may be understood as that in the M parts, a part is a cyclic postfix of a part preceding the part.

Figure 13A:
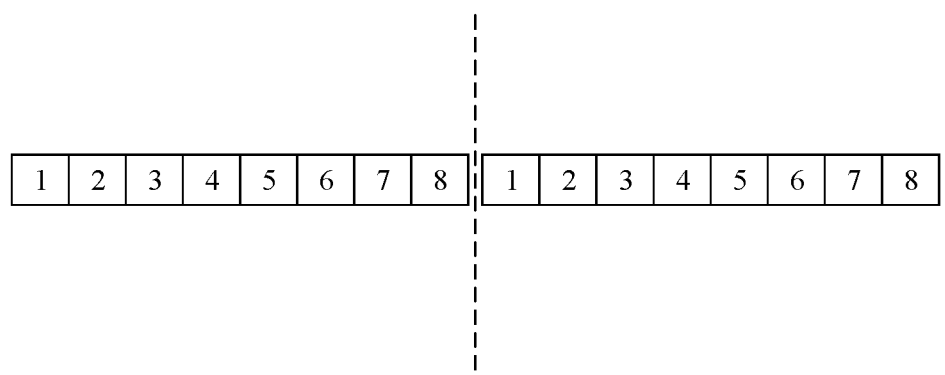
FIG. 13A is a first schematic diagram of a manner in which no CP is added according to an embodiment of this application.

FIG. 13A shows an example in which no CP is added to the M parts. In FIG. 13A, that N=2 and M=2 is used as an example. It can be learned that in the two parts in FIG. 13A, no CP is added to a start, a end, or a middle location of either part. FIG. 13A may be understood as that in the two parts, the 1$^{st}$ part is a cyclic prefix of the 2nd part, or may be understood as that in the two parts, the 2nd part is a cyclic postfix of the 1$^{st}$ part.

Figure 13B:
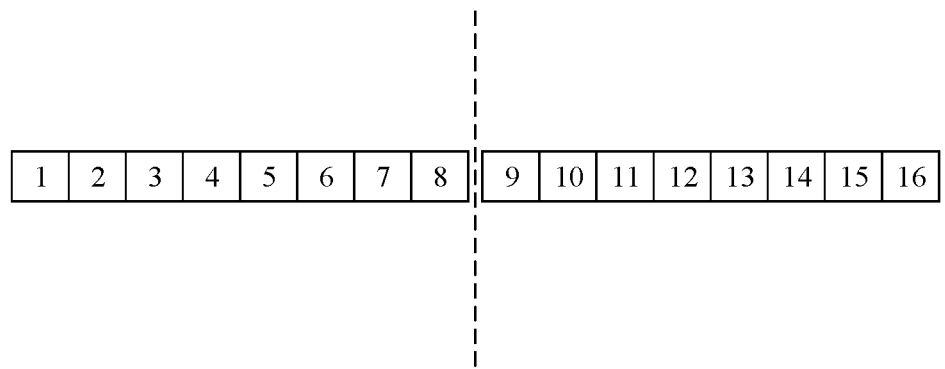
FIG. 13B is a second schematic diagram of a manner in which no CP is added according to an embodiment of this application.

FIG. 13B shows another example in which no CP is added to the M parts. In FIG. 13B, that N=2 and M=1 is used as an example. Square 1 to square 16 represent one part. It can be learned that no CP is not added to the part in FIG. 13B.

In each of FIG. 9, FIG. 10, FIG. 11A, FIG. 11B, FIG. 12A, FIG. 12B, FIG. 13A, and FIG. 13B, different time-domain symbols are separated by using the vertical dashed line. It can be learned that each of FIG. 9, FIG. 10, FIG. 11A, FIG. 12A, and FIG. 13A uses an example in which one time-domain symbol carries one of the M parts, and each of FIG. 11B, FIG. 12B, and FIG. 13B uses an example in which one part is carried on two time-domain symbols. In other words, one of the M parts may be carried on one time-domain symbol, or may be carried on a plurality of time-domain symbols, or one symbol may carry a plurality of parts. This is not specifically limited. It may be understood that a length of each of the M parts corresponds to a length of a detection window. Due to a characteristic of frequency-domain correlation detection, it needs to be ensured that consecutive parts observed in the detection window need to have a circularity characteristic. Therefore, in this embodiment of this application, the M parts are enabled to be the same, so that the reference signal has a circularity characteristic. How the M parts are carried on the N time-domain symbols is not limited in this embodiment of this application.

In actual application, which one of the foregoing manners is selected to process the CP in the first resource may be predefined by using a protocol, or may be negotiated between network devices in advance, and so on. This is not specifically limited.

In FIG. 11A, the CP added to the start of the 1$^{st}$ part includes sampling points corresponding to square 7 and square 8, and the CP added to the end of the 2nd part includes sampling points corresponding to square 1 and square 2. However, actually, another proportion may be used. For example, the sampling point corresponding to square 8 may be added to the start of the 1$^{st}$ part, and sampling point corresponding to square 1 to square 3 may be added to the end of the 2nd part. In this embodiment of this application, lengths of the added cyclic prefix and cyclic postfix are not limited provided that it is ensured that a sum of the length of the cyclic prefix added to the start of the 1$^{st}$ part in the M parts and the length of the cyclic postfix added to the end of the last part in the M parts is less than or equal to N*P, where P is a specified maximum length of a CP that can be added to each time-domain symbol. For example, for FIG. 11A, P=2. In this case, lengths of the CPs specifically added to the start of the 1$^{st}$ part and the end of the 2nd part are not limited provided that it is ensured that a sum of the length of the CP added to the start of the 1$^{st}$ part and the length of the CP added to the end of the 2nd part is less than or equal to 2*2=4. It can be learned that if no CP is added, the condition that the sum of the length of the cyclic prefix added to the start of the 1$^{st}$ part in the M parts and the length of the cyclic postfix added to the end of the last part in the M parts is less than or equal to N*P is also met.

Similarly, for FIG. 12A, the CP added to the start of the 1$^{st}$ part includes sampling points corresponding to square 7 and square 8, and the CP added to the end of the 3rd part includes sampling points corresponding to square 1 to square 4. However, actually, another proportion may be used. For example, sampling points corresponding to square 6 to square 8 may be added to the start of the 1$^{st}$ part, and sampling points corresponding to square 1 to square 3 may be added to the end of the $3^{rd}$ part. It only needs to be ensured that a sum of a length of the cyclic prefix added to the start of the $1^{st}$ part in the M parts and a length of the cyclic postfix added to the end of the last part in the M parts is less than or equal to N*P. For example, for FIG. 12A, P=2. In this case, it only needs to be ensured that the sum of the length of the cyclic prefix added to the start of the $1^{st}$ part in the M parts and the length of the cyclic postfix added to the end of the last part in the M parts is less than or equal to 3*2=6.

The M parts are enabled through the foregoing processing to have a circularity characteristic on the N symbols.

It can be learned that the reference signal is enabled through the foregoing processing to meet the two conditions described above, so that the second network device can perform blind detection on the reference signal through low-complexity frequency-domain correlation detection, and correctly obtain the reference signal. Therefore, detection complexity is reduced, and blind detection accuracy is improved; in other words, a requirement of obtaining, through detection with low complexity and high accuracy, a reference signal with an unknown arrival time is met.

Figure 14A:
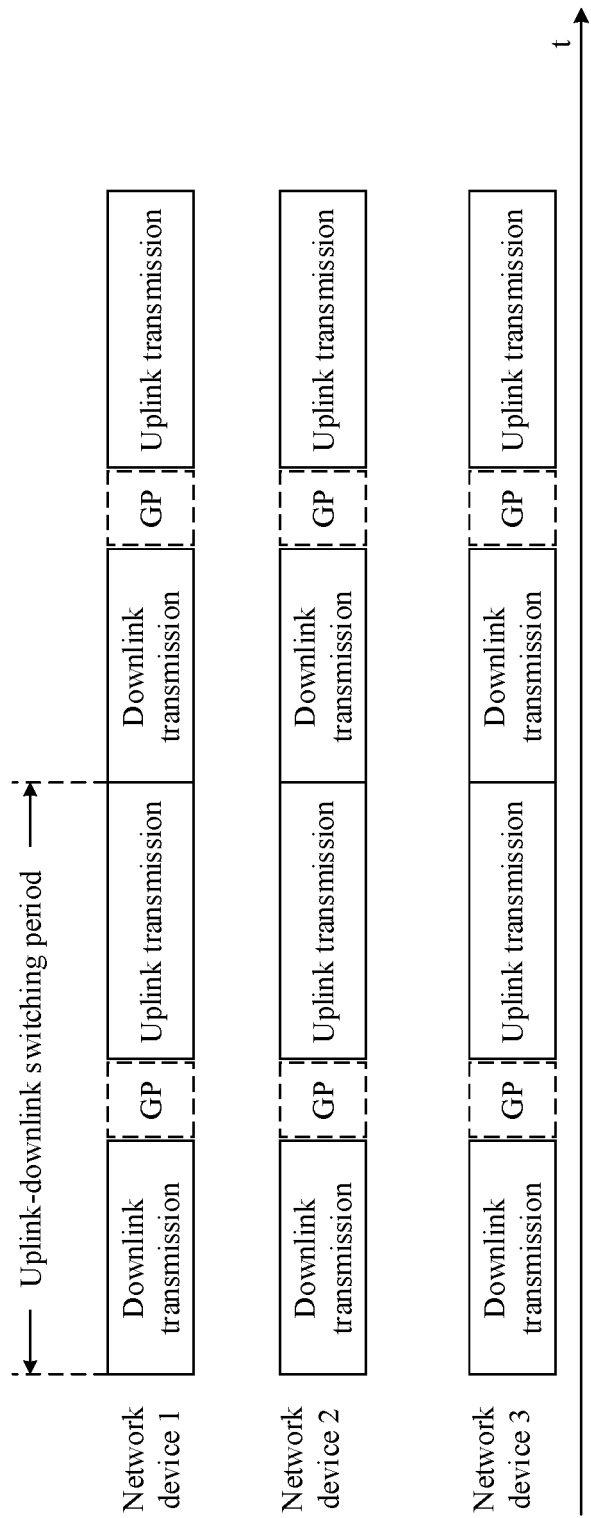
FIG. 14A is a schematic diagram showing that network devices participating in measurement use a same receive and transmit time configuration according to an embodiment of this application.
Figure 14B:
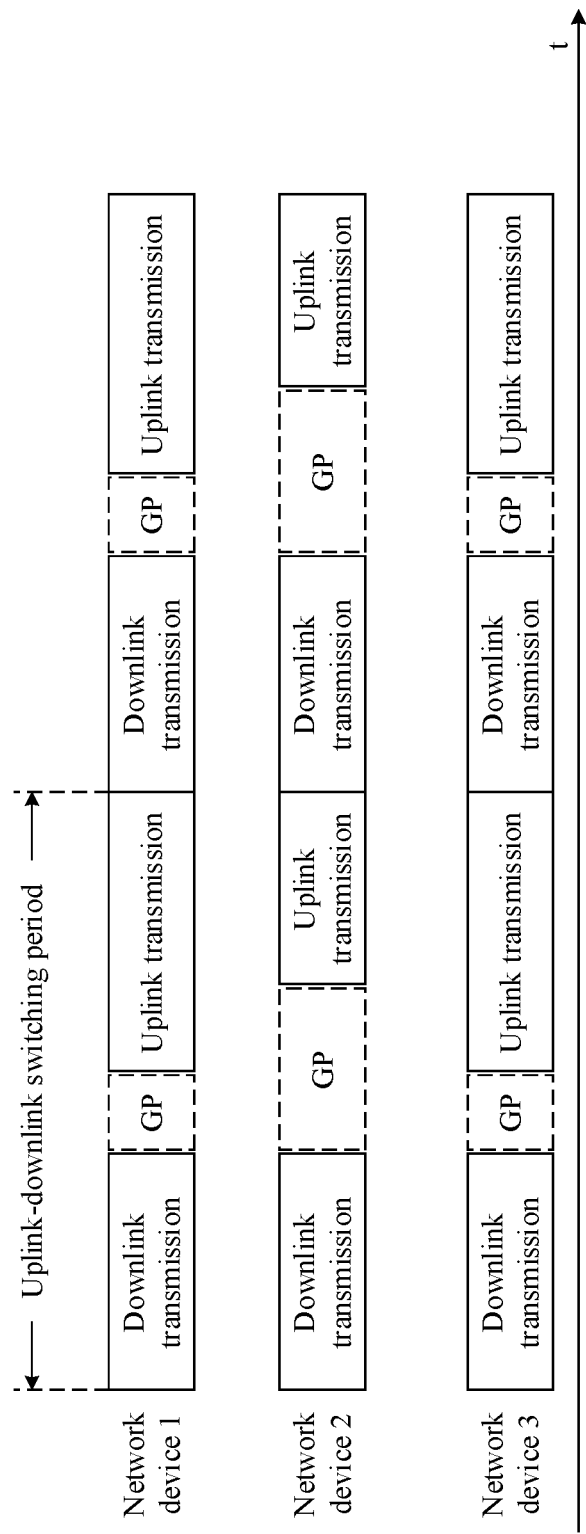
FIG. 14B is another schematic diagram showing that network devices participating in measurement use a same receive and transmit time configuration according to an embodiment of this application.

In this embodiment of this application, network devices participating in measurement may use a same receive and transmit time configuration, that is, use a same uplink-downlink switching period. For example, the first network device and the second network device may use a same uplink-downlink switching period. The network devices participating in measurement use a same downlink transmission duration, a same uplink transmission time, and a same uplink-downlink time interval in each uplink-downlink switching period. For example, referring to FIG. 14A, three network devices, namely, a network device 1, a network device 2, and a network device 3, participate in measurement. The three network devices use a same uplink-downlink switching period, and use a same downlink transmission duration, a same uplink transmission time, and a same uplink-downlink time interval in each uplink-downlink switching period. Alternatively, although using a same uplink-downlink switching period, different network devices may use different uplink transmission time and different uplink-downlink time intervals in one uplink-downlink switching period, but a sum of the uplink transmission time and the uplink-downlink time interval of each network device in one uplink-downlink switching period needs to be the same as a sum of the uplink transmission time and the uplink-downlink time interval of the other network device in the uplink-downlink switching period. For example, referring to FIG. 14B, three network devices, namely, a network device 1, a network device 2, and a network device 3, participate in measurement. The three network devices use a same uplink-downlink switching period. In each uplink-downlink switching period, the network device 2 and the other two network devices use only a same downlink transmission duration, but different uplink transmission time and different uplink-downlink time intervals, but in each uplink-downlink switching period, a sum of the uplink transmission time and the uplink-downlink time interval that are used by the network device 2 is the same as a sum of the uplink transmission time and the uplink-downlink time interval that are used by each of the other two network devices.

In this embodiment of this application, when sending a reference signal used for measurement between network devices, different network devices may send the reference signal at a same location. In other words, a location at which the network device sends the reference signal used for measurement between the network devices may be specified in advance. For example, the location may be predefined by using a protocol. In this way, a reference signal detection process can be simplified.

When a network device receives and obtains a reference signal through blind detection, the network device originally can determine, based on the received reference signal, a network device that sends the reference signal. How to determine, based on the received reference signal, the network device that sends the reference signal is described below. However, it is also possible that the network device sending the reference signal cannot be identified based on the received reference signal. In this case, if the receiving network device and the sending network device use a same receive and transmit time configuration and a same reference signal sending location, the network device receiving the reference signal can roughly determine, based on the received reference signal, a location of the network device sending the reference signal. This helps to locate an interfering source.

When sending the reference signal used for measurement between network devices, different network devices may send the reference signal at a same location. In an optional manner, the network device may send the reference signal on the last N time-domain symbols in a downlink transmission duration in an uplink-downlink switching period. In other words, the network device may send the reference signal on the last one or more time-domain symbols in the downlink transmission duration in the uplink-downlink switching period. A specific quantity of the last time-domain symbols used for sending the reference signal depends on a quantity of time-domain symbols occupied by the reference signal.

The reference signal is sent by using the last time-domain symbol in the downlink transmission duration in the uplink-downlink switching period, so that a maximum interference range can be determined first. Because the N time-domain symbols occupied by the reference signal are the last N time-domain symbols in the downlink transmission duration, after obtaining the reference signal through detection, the second network device can determine that no CLI interference is caused to a range after the reference signal is obtained through detection, so that an interference cancellation means can be further applied, for example, lower-order modulation, a lower bit rate, or the like is used for an area receiving CLI interference, to reduce or eliminate the interference.

Figure 15A:
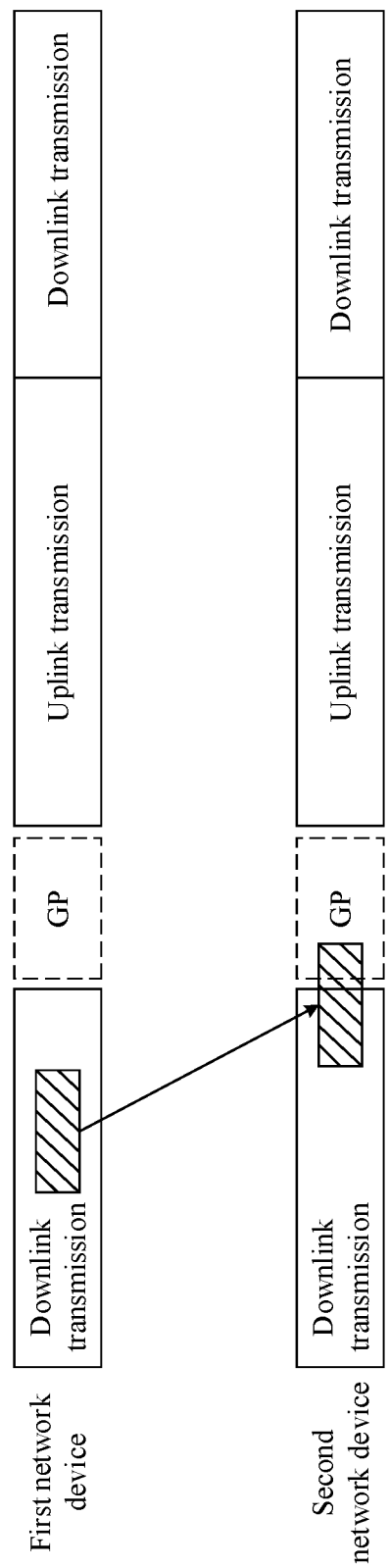
FIG. 15A is a schematic diagram showing that a reference signal is not sent on the last N time-domain symbols in a downlink transmission duration in an uplink-downlink switching period according to an embodiment of this application.
Figure 15B:
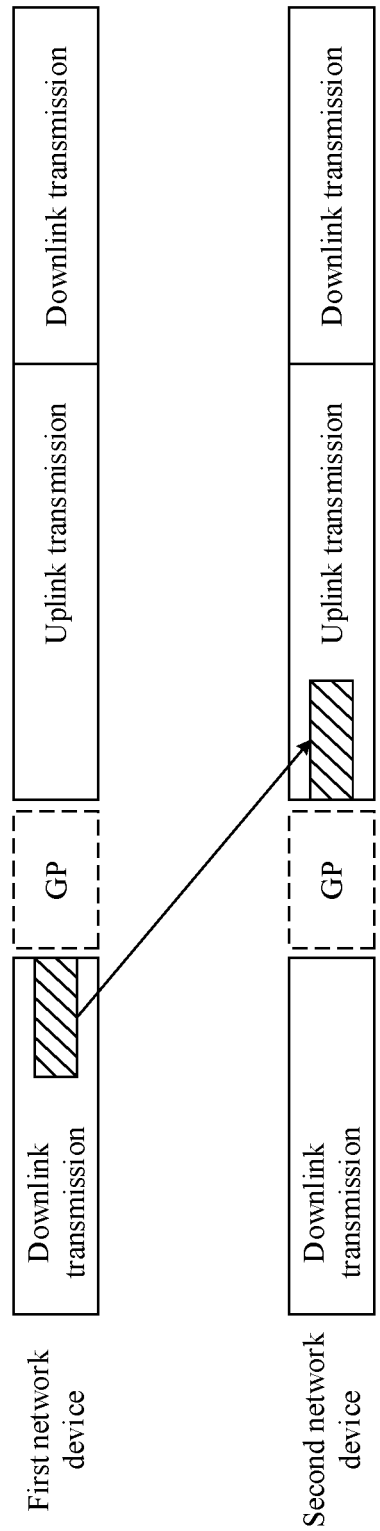
FIG. 15B is a schematic diagram showing that a reference signal is sent on the last N time-domain symbols in a downlink transmission duration in an uplink-downlink switching period according to an embodiment of this application.

Second, a detection success rate can be ensured to the greatest extent. Referring to FIG. 15A, if the reference signal is not sent on the last N time-domain symbols in the downlink transmission duration in the uplink-downlink switching period, but is sent on another N time-domain symbols in the downlink transmission duration in the uplink-downlink switching period, it is possible that the second network device is still in the downlink transmission duration after the reference signal arrives at the second network device after a delay. As shown in FIG. 15A, a start location of the reference signal is in the downlink transmission duration of the second network device. In this case, the second network device is in a sending process, and generally does not receive or detect a signal. As a result, the second network device cannot detect the reference signal. However, a downlink signal of the first network device may still cause CLI interference to an uplink receiving process of the second network device. In view of this, this embodiment of this application provides a solution of sending the reference signal by using the last symbol in the downlink transmission duration in the uplink-downlink switching period. Referring to FIG. 15B, the reference signal is sent on the last N time-domain symbols in the downlink transmission duration in the uplink-downlink switching period, and after the reference signal arrives at the second network device after a delay, the second network device is in an uplink transmission time, so that the second network device can correctly obtain the reference signal through detection, to complete measurement. In FIG. 15A and FIG. 15B, slashed boxes represent the reference signal.

S73. The second network device determines a second resource used to receive the reference signal, where a time-domain symbol included in the second resource is an uplink time-domain symbol and/or a guard period time-domain symbol.

In this embodiment of this application, the second network device may receive the reference signal in the uplink transmission time, and FIG. 15B shows an example. Alternatively, the second network device may receive the reference signal in a guard period (guard period, GP). Alternatively, the second network device may receive the reference signal in both the GP and the uplink transmission time. This is not specifically limited. Therefore, the time-domain symbol included in the second resource may be an uplink time-domain symbol and/or a GP time-domain symbol.

For example, the second resource determined by the second network device may include uplink time-domain symbols in all uplink-downlink switching periods, or GP time-domain symbols in all uplink-downlink switching periods, or uplink time-domain symbols and GP time-domain symbols in all uplink-downlink switching periods, so that detection can be more comprehensive, and omission of a reference signal can be avoided. Alternatively, for example, it is predefined, by using a protocol or in another manner, that the reference signal used for measurement between network devices is transmitted in a specific uplink-downlink switching period. In this case, the second resource determined by the second network device may further include an uplink time-domain symbol in the specific uplink-downlink switching period, or a GP time-domain symbol in the specific uplink-downlink switching period, or an uplink time-domain symbol and a GP time-domain symbol in the specific uplink-downlink switching period, so that a quantity of receiving times of the second network device can be reduced, thereby facilitating power-saving of the second network device.

A sequence of S73 and the two steps of S71 and S72 is not limited. For example, S71 and S72 may be performed before S73, or S71 and S72 may be performed after S73, or S73 and the two steps of S71 and S72 may be performed at the same time. For example, that S73 and S71 are performed at the same time, or that S73 and S72 are performed at the same time, or that S73 is performed after S71 and before S72 is considered as that S73 and the two steps of S71 and S72 are performed at the same time. S74. The first network device sends the reference signal on the first resource, and the second network device receives all or a part of the reference signal on the second resource.

The first resource includes the N time-domain symbols, and after generating the reference signal, the first network device may send the reference signal on the first resource. A plurality of network devices may receive the reference signal. The network devices may receive the reference signal in a same manner. Therefore, in this specification, that the second network device receives the reference signal is used as an example.

The second resource determined by the second network device may be understood as a resource on which the second network device performs blind detection, and a resource on which the second network device actually receives the reference signal should be a subset of the second resource. For example, the resource on which the second network device actually receives the reference signal is referred to as a third resource. FIG. 15B is used as an example. The second resource may be understood as a resource corresponding to a GP and uplink transmission of the second network device in FIG. 15B, and the third resource may be understood as a resource corresponding to a location at which the second network device receives the reference signal of the first network device in FIG. 15B, namely, a resource at a location of a slashed box in FIG. 15B.

Figure 16:
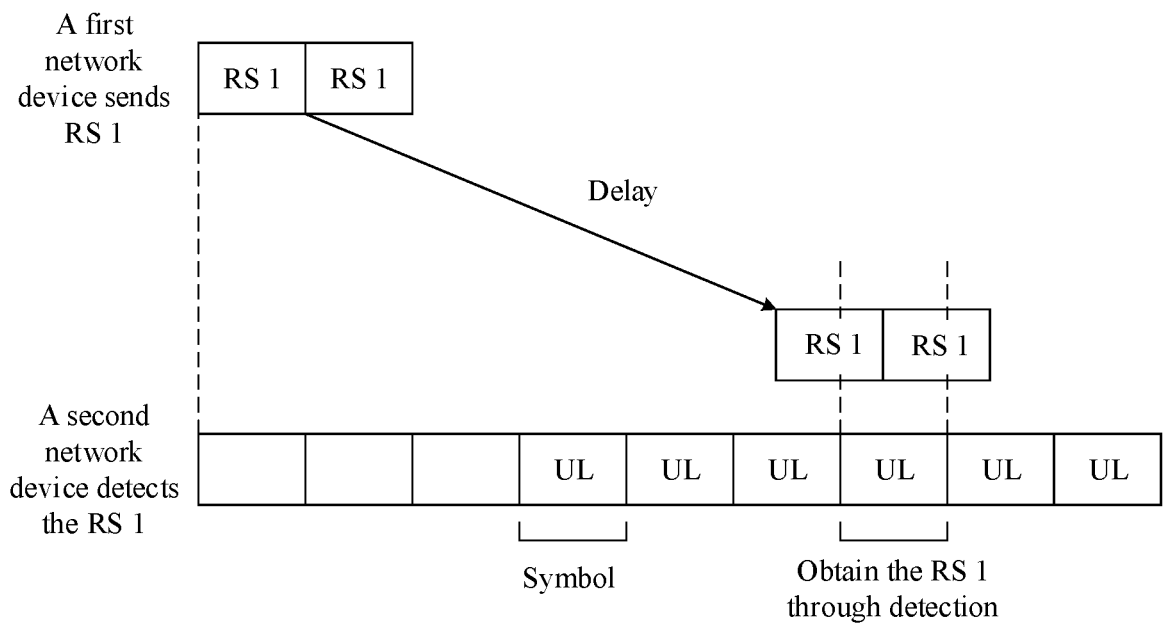
FIG. 16 is a schematic diagram showing that a second network device detects a reference signal by using a generated reference signal according to an embodiment of this application.

For example, the second network device may predetermine at least one network device that may cause CLI interference to the second network device. Information about the at least one network device may be preconfigured in the second network device, or may be obtained by the second network device in another manner. The second network device may generate at least one reference signal corresponding to the at least one network device. Herein, this is understood as that reference signals sent by different network devices are different. After receiving the reference signal, the second network device may separately perform a cross-correlation operation on the at least one generated reference signal and the received reference signal. For example, when the second network device performs a cross-correlation operation on a generated reference signal and the received reference signal, if a correlation peak value exceeds a specific threshold, the second network device can determine that the received reference signal is the reference signal. In addition, because when generating the reference signal, the second network device learns of a network device corresponding to the generated reference signal, the second network device can determine that the received reference signal is sent by the first network device. This indicates that a network device sending a reference signal can be determined based on the received reference signal, as described above. For example, referring to FIG. 16, the first network device sends RS 1 as a reference signal, the second network device has generated a plurality of reference signals locally in advance, and the plurality of reference signals include the RS1. After obtaining the RS 1 through detection, the second network device may perform a cross-correlation operation on the generated reference signals and the received signal. If a correlation peak value exceeds the specific threshold when a cross-correlation operation is performed on the generated RS 1 and the received RS 1, the second network device can determine that the received signal is the RS 1 from the first network device.

In addition, as mentioned above, it is possible that the second network device cannot determine, based on the received reference signal, a network device sending the reference signal, and that detection continues to be implemented through a cross-correlation operation is still used as an example. For example, the second network device performs a cross-correlation operation on the at least one generated reference signal and the received reference signal, but the cross-correlation operation fails. In other words, when a cross-correlation operation is performed on the at least one reference signal and the received reference signal, no correlation peak value exceeds the specific threshold. Then, the second network device can determine that the received reference signal is different from the at least one reference signal. In this case, the second network device cannot directly determine a network device sending the reference signal. In this embodiment of this application, the second network device may roughly locate, based on the reference signal, the network device sending the reference signal, to finally determine an interfering source.

In addition, a sequence of steps such as S71 to S74 in the embodiment shown in FIG. 7 is not limited in this embodiment of this application. S72 and S74 are used as an example. If "receiving" is understood as "detecting", S74 may be performed before S72. It is assumed that the first network device and the second network device are located far away from each other, and a bending effect of the troposphere affects signal propagation. In this case, the second network device cannot determine an arrival time of a measurement signal from the first network device. Therefore, the second network device may detect, on all symbols on which signals can be received, whether there is a reference signal. In this case, S74 may be performed before S72. However, although the second network device can start detection early, the second network device can obtain, through detection, the reference signal from the first network device only after the reference signal sent by the first network device arrives at the second network device. Therefore, if "receiving" is understood as "successful receiving" or "successful detecting", S72 may be performed before S74.

In this embodiment of this application, after receiving the reference signal, the second network device may perform a plurality of types of processing. For example, the second network device may determine that the first network device sending the reference signal is an interfering source, and may further perform corresponding processing such as interference cancellation. For example, the second network device may schedule a terminal device not to send data on an interfered symbol, or reduce interference by using an interference rejection combining (IRC) algorithm.

According to the method provided in this embodiment of this application, a network device can be enabled to perform effective super-long-distance interference measurement, and further, can perform super-long-distance interference cancellation, thereby improving transmission performance of a communications system.

The method provided in this embodiment of this application may be used to perform super-long-distance measurement, but may also be actually used for measurement between neighboring network devices (which may be understood as network devices located relatively close to each other). A difference lies in that in a scenario of measurement between neighboring network devices, because a delay caused by a geographical distance can almost be ignored, an arrival time of a reference signal between network devices that perform measurement is basically determined.

Generally, a terminal device usually does not perform receiving or sending in a GP. Therefore, for example, if the first network device and the second network device that participate in measurement are neighboring network devices, the first network device may send the reference signal in a downlink transmission duration and/or a GP. In other words, the first network device may send the reference signal in the downlink transmission duration, or send the reference signal in the GP, or send the reference signal in both the downlink transmission duration and the GP time. The second network device may receive the reference signal in the GP. In this case, the reference signal does not cause interference to data sent by the terminal device, data that needs to be received by the terminal device, and the like, thereby improving a success rate of transmitting the reference signal and the data by the terminal device.

Figure 17A:
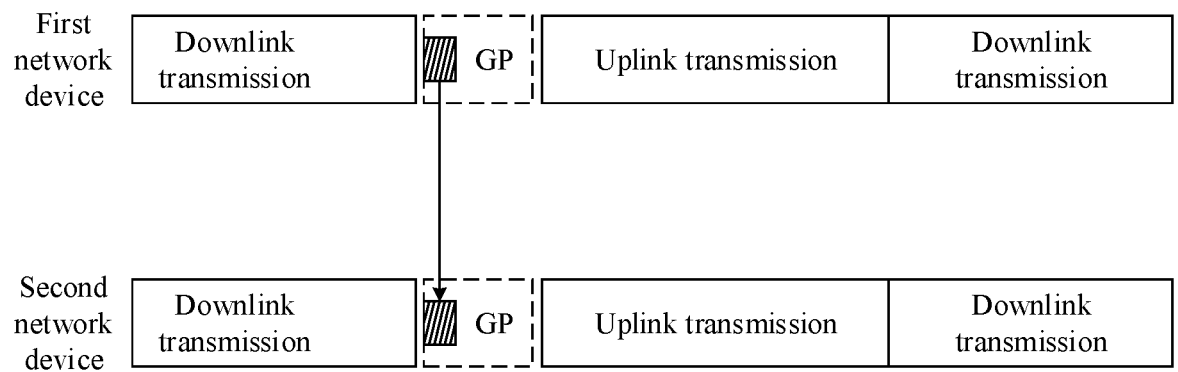
FIG. 17A is a schematic diagram showing that a first network device sends a reference signal in a GP and a second network device receives the reference signal in a GP according to an embodiment of this application.

For example, referring to FIG. 17A, the first network device and the second network device are, for example, neighboring network devices. The first network device and the second network device use a same uplink-downlink switching period, and in one uplink-downlink switching period, uplink transmission time is aligned, GPs are aligned, and downlink transmission duration is aligned. When sending the reference signal to the second network device, the first network device may send the reference signal in the GP. Because the two network devices are located relatively close to each other, and a delay caused by a geographical distance almost can be ignored, the second network device also receives the reference signal in the GP, so that receiving of the reference signal does not affect data receiving or sending of the second network device. In this case, N time-domain symbols occupied by the reference signal may be N time-domain symbols in the GP. In FIG. 17A, a slashed box represents the reference signal.

Figure 17B:
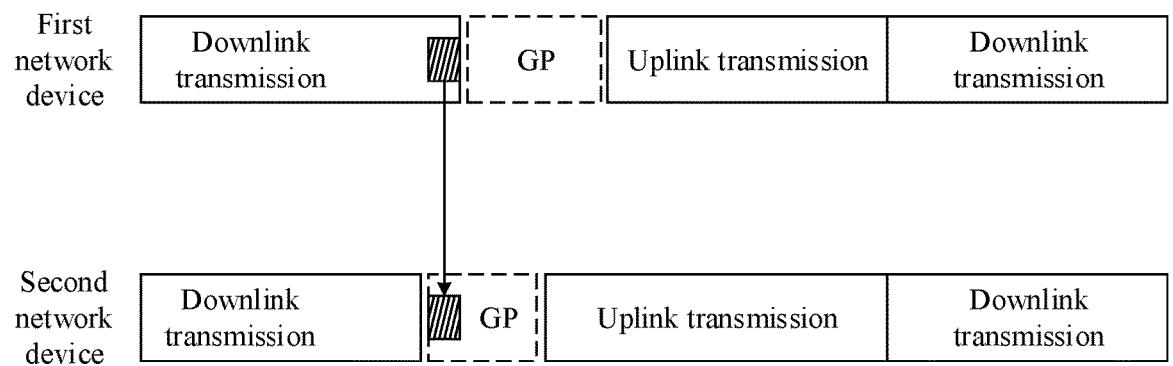
FIG. 17B is a schematic diagram showing that a first network device sends a reference signal in a downlink transmission duration and a second network device receives the reference signal in a GP according to an embodiment of this application.

For another example, referring to FIG. 17B, the first network device and the second network device are, for example, neighboring network devices. The first network device and the second network device use a same uplink-downlink switching period, but in one uplink-downlink switching period, uplink transmission time of the first network device and the second network device is not aligned, GPs of the first network device and the second network device are not aligned, and downlink transmission duration of the first network device and the second network device is not aligned. Because a time segment of the downlink transmission duration of the first network device in the uplink-downlink switching period is aligned with the GP of the second network device, the first network device may send the reference signal to the second network device in the time segment that is of the downlink transmission duration and that is aligned with the GP of the second network device, and then, the second network device may receive the reference signal in the GP, so that receiving of the reference signal does not affect data receiving or sending of the second network device. It can be learned that the N time-domain symbols occupied by the reference signal may still be the last N time-domain symbols in a downlink transmission duration in an uplink-downlink switching period, or may be N time-domain symbols, starting from a start location at which a downlink transmission duration of the first network device is aligned with a GP of the second network device, in a downlink transmission duration and/or a GP in an uplink-downlink switching period. In FIG. 17B, a slashed box represents the reference signal.

In short, it is ensured as much as possible that the reference signal sent by the first network device does not interfere with uplink signal receiving of the second network device.

In this embodiment of this application, if the first network device and the second network device are network devices located relatively close to each other, a difference between measurement between the first network device and the second network device and measurement between network devices located super far away from each other lies in that the second network device can obtain configuration information in advance. For the second network device, the configuration information is used to determine the first resource, and/or is used to determine the reference signal. In other words, the configuration information can be used to determine the first resource, or the configuration information can be used to determine the reference signal, or the configuration information can be used to determine the first resource and the reference signal. For example, if the configuration information is used to determine the first resource, the configuration information may include time-domain and/or frequency-domain configuration information of the first resource, that is, include time-domain information of the first resource, or include frequency-domain information of the first resource, or include time-domain and frequency-domain information of the first resource. For another example, if the configuration information is used to determine the reference signal, the configuration information may include a sequence used to generate the reference signal, or include other information used to generate the reference signal, for example, include at least one piece of information such as $n_{s,f}^\mu$, l, and $R_{ID}$, for example, include $n_{s,f}^\mu$ and l, or include l, or include $n_{s,f}^\mu$, l, and $R_{ID}$. Content included in the configuration information is not limited in this embodiment of this application, provided that the second network device can determine the first resource and/or the reference signal by using the configuration information. The second network device can determine, by using the configuration information, a configuration used by the first network device to send the reference signal, and can further determine a location of a to-be-detected time-frequency resource and/or determine a to-be-detected reference signal.

The configuration information may be sent by the first network device to the second network device, or may be configured by a higher-layer control node for the second network device, or may be manually configured by an engineer during network deployment. A method for obtaining, by the second network device, the configuration information is not limited. For the second network device, the configuration information is used to determine the first resource and/or is used to determine the reference signal. Then, for a network device (for example, the first network device) that sends the configuration information or configures the configuration information, the configuration information is used to indicate the first resource and/or is used to indicate the reference signal.

In addition, if the first network device and the second network device are network devices located relatively close to each other, because the first network device may send the configuration information in advance, to implement measurement between the first network device and the second network device, the first network device and the second network device may use a same uplink-downlink configuration, or may use different uplink-downlink configurations. This is not specifically limited.

Figure 18:
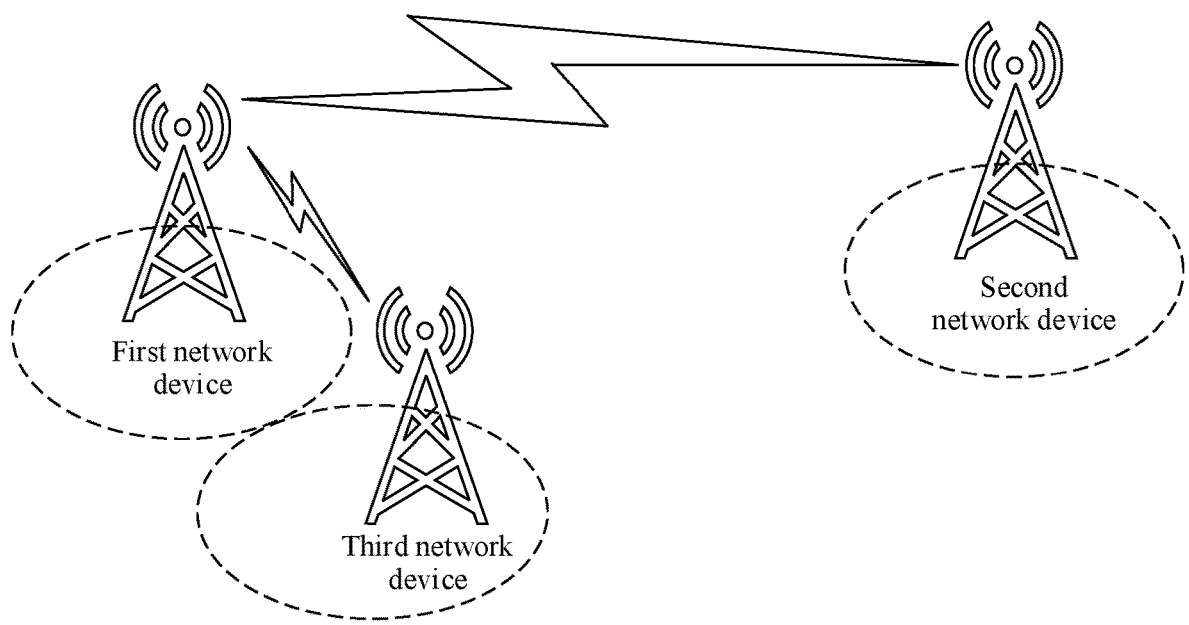
FIG. 18 is a schematic diagram of a scenario in which a same reference signal is reused for measurement between network devices located super far away from each other and measurement between network devices located relatively close to each other according to an embodiment of this application.

The technical solutions provided in the embodiments of this application may be applied to both measurement between network devices located super far away from each other and measurement between network devices located relatively close to each other. In this case, in an implementation, a same reference signal may be reused for measurement between network devices located super far away from each other and measurement between network devices located relatively close to each other. For this scenario, refer to FIG. 18. FIG. 18 includes three network devices, namely, a first network device, a second network device, and a third network device. A distance between the first network device and the second network device is relatively long, a distance between the first network device and the third network device is relatively short, measurement needs to be performed between the first network device and the second network device, and measurement also needs to be performed between the first network device and the third network device. In this case, measurement between the first network device and the second network device is measurement between network devices located super far away from each other, and measurement between the first network device and the third network device is measurement between network devices located relatively close to each other. Then, a same reference signal, for example, the reference signal, may be reused in the two measurement processes.

Figure 19:
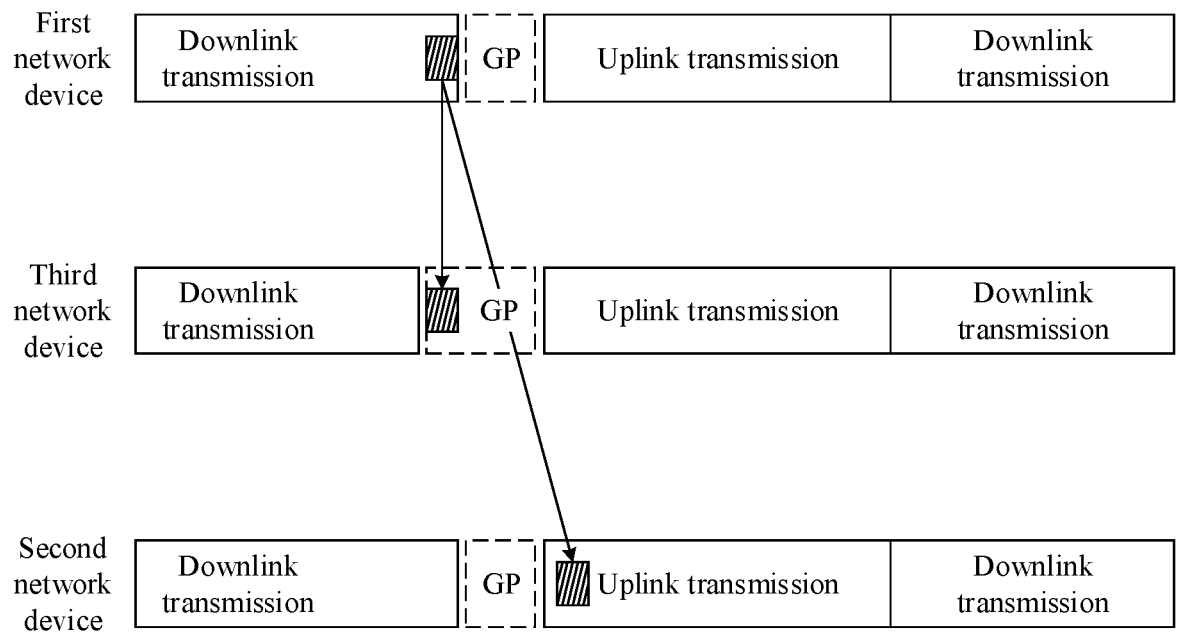
FIG. 19 is a schematic diagram of a measurement process in which a same reference signal is reused for measurement between network devices located super far away from each other and measurement between network devices located relatively close to each other according to an embodiment of this application.

For the measurement processes in the scenario shown in FIG. 18, refer to FIG. 19. A same reference signal sent by the first network device is used for both measurement between network devices located super far away from each other and measurement between network devices located relatively close to each other. For the third network device, because the distance between the third network device and the first network device is relatively short, the third network device may determine, based on a time at which the first network device sends the reference signal, a time at which the reference signal needs to be received, and does not need to perform blind detection in all GPs and/or uplink transmission time. For measurement between the first network device and the second network device, and content such as configuration information that can be obtained by the third network device when measurement is performed between the first network device and the third network device, refer to the foregoing descriptions. In FIG. 19, slashed boxes represent the reference signal.

The method provided in this embodiment of this application can be used for both measurement between network devices located super far away from each other and measurement between network devices located relatively close to each other. A mechanism for measurement between network devices is provided, to help a network device to determine an interfering source, and further to take a corresponding measure such as interference cancellation, thereby improving communication quality.

The following describes, with reference to the accompanying drawings, apparatuses configured to implement the foregoing method in the embodiments of this application. Therefore, all the foregoing content may be used in subsequent embodiments, and repeated content is not described again.

Figure 20:
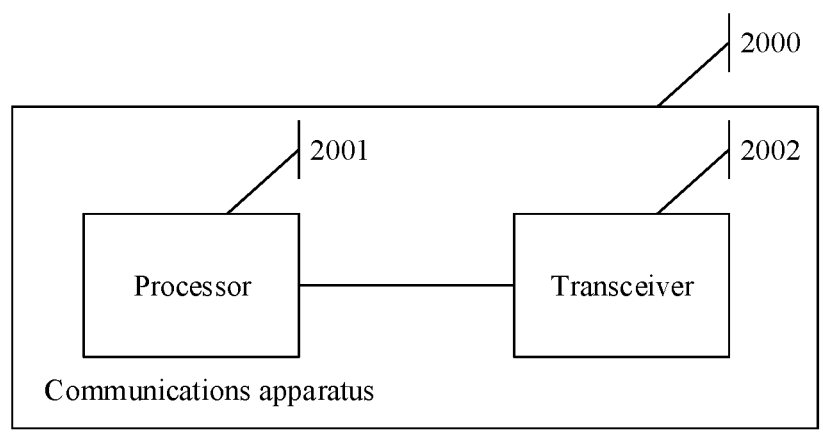
FIG. 20 is a schematic diagram of a communications apparatus that can implement a function of a first network device according to an embodiment of this application.

FIG. 20 is a schematic structural diagram of a communications apparatus 2000. The communications apparatus 2000 may implement functions of the first network device in the foregoing description. The communications apparatus 2000 may be the first network device described above, or may be a chip disposed in the first network device described above. The communications apparatus 2000 may include a processor 2001 and a transceiver 2002. The processor 2001 may be configured to perform S71 and S72 in the embodiment shown in FIG. 7, and/or configured to support another process of the technology described in this specification. The transceiver 2002 may be configured to perform S74 in the embodiment shown in FIG. 7, and/or configured to support another process of the technology described in this specification.

For example, the processor 2001 is configured to: determine a first resource, and generate a reference signal corresponding to the first resource. The reference signal includes M parts, and all of the M parts are the same. The first resource does not carry a cyclic prefix of the reference signal or a cyclic postfix of the reference signal. Alternatively, the first resource carries a cyclic prefix of the reference signal and the cyclic prefix corresponding to the reference signal is located only on a start of the $1^{st}$ part in the M parts, and/or the first resource carries a cyclic postfix of the reference signal and the cyclic postfix corresponding to the reference signal is located only at the end of the last part in the M parts. M is a positive integer.

The transceiver 2002 is configured to send the reference signal on the first resource.

All related content of the steps in the foregoing method embodiments may be cited in function descriptions of the corresponding functional modules. Details are not described herein again.

Figure 21:
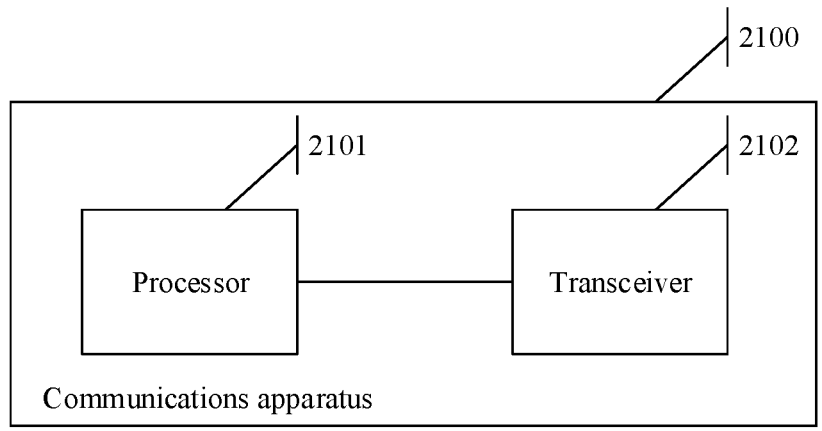
FIG. 21 is a schematic diagram of a communications apparatus that can implement a function of a second network device according to an embodiment of this application.

FIG. 21 is a schematic structural diagram of a communications apparatus 2100. The communications apparatus 2100 may implement functions of the second network device in the foregoing description. The communications apparatus 2100 may be the second network device described above, or may be a chip disposed in the second network device described above. The communications apparatus 2100 may include a processor 2101 and a transceiver 2102. The processor 2101 may be configured to perform S73 in the embodiment shown in FIG. 7, and/or configured to support another process of the technology described in this specification. The transceiver 2102 may be configured to perform S74 in the embodiment shown in FIG. 7, and/or configured to support another process of the technology described in this specification.

For example, the processor 2101 is configured to determine a second resource used to receive a reference signal, where a time-domain symbol included in the second resource is an uplink time-domain symbol and/or a guard period time-domain symbol.

The transceiver 2102 is configured to receive a part or all of the reference signal on the second resource. The reference signal includes M parts, and all of the M parts are the same. The first resource does not carry a cyclic prefix of the reference signal or a cyclic postfix of the reference signal. Alternatively, the first resource carries a cyclic prefix of the reference signal and the cyclic prefix corresponding to the reference signal is located only at the start of the 1st part in the M parts, and/or the first resource carries a cyclic postfix of the reference signal and the cyclic postfix corresponding to the reference signal is located only at the end of the last part in the M parts. M is a positive integer.

All related content of the steps in the foregoing method embodiments may be cited in function descriptions of the corresponding functional modules. Details are not described herein again.

Figure 22A:
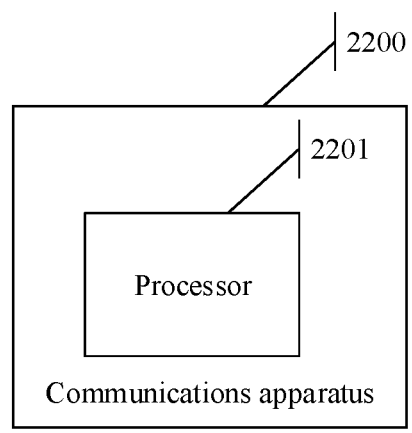
FIG. 22A and FIG. 22B are two schematic diagrams of a communications apparatus according to an embodiment of this application.

In a simple embodiment, a person skilled in the art can figure out that the communications apparatus 2000 or the communications apparatus 2100 may alternatively be implemented by using a structure of a communications apparatus 2200 shown in FIG. 22A. The communications apparatus 2200 may implement functions of the terminal device or the network device described above. The communications apparatus 2200 may include a processor 2201.

When the communications apparatus 2200 is configured to implement functions of the first network device in the foregoing description, the processor 2201 may be configured to perform S71 and S72 in the embodiment shown in FIG. 7, and/or configured to support another process of the technology described in this specification. Alternatively, when the communications apparatus 2200 is configured to implement functions of the second network device in the foregoing description, the processor 2201 may be configured to perform S73 in the embodiment shown in FIG. 7, and/or configured to support another process of the technology described in this specification.

The communications apparatus 2200 may be implemented by a field programmable gate array (FPGA), an application-specific integrated chip (ASIC), a system on chip (SoC), a central processing unit (CPU), a network processor (NP), a digital signal processor (DSP), a micro controller unit (MCU), or a programmable logic device (PLD) or another integrated chip. The communications apparatus 2200 may be disposed in the first network device or the second network device in the embodiments of this application, so that the first network device or the second network device implements the method provided in the embodiments of this application.

In an optional implementation, the communications apparatus 2200 may include a transceiver component, configured to communicate with another device. When the communications apparatus 2200 is configured to implement functions of the first network device or the second network device in the foregoing description, the transceiver component may be configured to perform S74 in the embodiment shown in FIG. 7, and/or configured to support another process of the technology described in this specification. For example, the transceiver component is a communications interface. If the communications apparatus 2200 is a first network device or a second network device, the communications interface may be a transceiver in the first network device or the second network device, for example, a transceiver 2002 or a transceiver 2102. The transceiver is, for example, a radio frequency transceiver component in the first network device or the second network device. Alternatively, if the communications apparatus 2200 is a chip disposed in the first network device or the second network device, the communications interface may be an input/output interface of the chip, for example, an input/output pin.

Figure 22B:
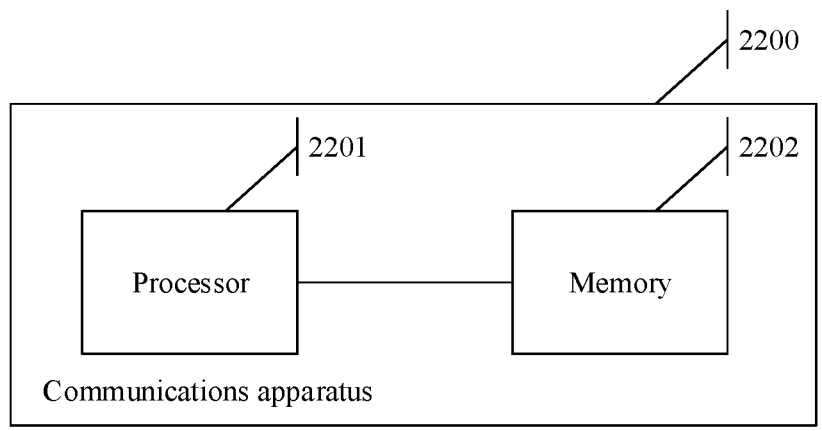

In an optional implementation, the communications apparatus 2200 may further include a memory 2202. Refer to FIG. 22B. The memory 2202 is configured to store computer programs or instructions, and the processor 2201 is configured to decode and execute the computer programs or the instructions. It should be understood that these computer programs or instructions may include function programs of the first network device or the second network device. When the function programs of the first network device are decoded and executed by the processor 2201, the first network device may implement functions of the first network device in the method provided in the embodiment shown in FIG. 5 in the embodiments of this application. When the function programs of the second network device are decoded and executed by the processor 2201, the second network device may implement functions of the second network device in the method provided in the embodiment shown in FIG. 5 in the embodiments of this application.

In another optional implementation, the function programs of the first network device or the second network device are stored in an external memory of the communications apparatus 2200. When the function programs of the first network device are decoded and executed by the processor 2201, the memory 2202 temporarily stores some or all content of the function programs of the first network device. When the function programs of the second network device are decoded and executed by the processor 2201, the memory 2202 temporarily stores some or all content of the function programs of the second network device.

In another optional implementation, the function programs of the first network device or the second network device are stored in the memory 2202 in the communications apparatus 2200. When the memory 2202 in the communications apparatus 2200 stores the function programs of the first network device, the communications apparatus 2200 may be disposed in the first network device in the embodiments of this application. When the memory 2202 in the communications apparatus 2200 stores the function programs of the second network device, the communications apparatus 2200 may be disposed in the second network device in the embodiments of this application.

In still another optional implementation, some content of the function programs of the first network device is stored in an external memory of the communications apparatus 2200, and the other content of the function programs of the first network device is stored in the memory 2202 in the communications apparatus 2200. Alternatively, some content of the function programs of the second network device is stored in an external memory of the communications apparatus 2200, and the other content of the function programs of the second network device is stored in the memory 2202 in the communications apparatus 2200.

In the embodiments of this application, the communications apparatus 2000, the communications apparatus 2100, and the communications apparatus 2200 are presented in a form in which each functional module is obtained through division based on each function, or may be presented in a form in which each functional module is obtained through division in an integrated manner. The "module" herein may be an ASIC, a processor and a memory that execute one or more software or firmware programs, an integrated logic circuit, and/or another component that can provide the foregoing functions.

In addition, the communications apparatus 2000 provided in the embodiment shown in FIG. 20 may alternatively be implemented in another form. For example, the communications apparatus includes a processing module and a transceiver module. For example, the processing module may be implemented by the processor 2001, and the transceiver module may be implemented by the transceiver 2002. The processing module may be configured to perform S71 and S72 in the embodiment shown in FIG. 7, and/or configured to support another process of the technology described in this specification. The transceiver module may be configured to perform S74 in the embodiment shown in FIG. 7, and/or configured to support another process of the technology described in this specification.

For example, the processing module is configured to: determine a first resource, and generate a reference signal corresponding to the first resource. The reference signal includes M parts, and all of the M parts are the same. The first resource does not carry a cyclic prefix of the reference signal or a cyclic postfix of the reference signal. Alternatively, the first resource carries a cyclic prefix of the reference signal and the cyclic prefix corresponding to the reference signal is located only at the start of the $1^{st}$ part in the M parts, and/or the first resource carries a cyclic postfix of the reference signal and the cyclic postfix corresponding to the reference signal is located only at the end of the last part in the M parts. M is a positive integer.

The transceiver module is configured to send the reference signal on the first resource.

All related content of the steps in the foregoing method embodiments may be cited in function descriptions of the corresponding functional modules. Details are not described herein again.

Similarly, the communications apparatus 2100 provided in the embodiment shown in FIG. 21 may alternatively be implemented in another form. For example, the communications apparatus includes a processing module and a transceiver module. For example, the processing module may be implemented by the processor 2101, and the transceiver module may be implemented by the transceiver 2102. The processing module may be configured to perform S73 in the embodiment shown in FIG. 7, and/or configured to support another process of the technology described in this specification. The transceiver module may be configured to perform S74 in the embodiment shown in FIG. 7, and/or configured to support another process of the technology described in this specification.

For example, the processing module is configured to determine a second resource used to receive a reference signal, where a time-domain symbol included in the second resource is an uplink time-domain symbol and/or a guard period time-domain symbol.

The transceiver module is configured to receive a part or all of the reference signal on the second resource. The reference signal includes M parts, and all of the M parts are the same. The first resource does not carry a cyclic prefix of the reference signal or a cyclic postfix of the reference signal. Alternatively, the first resource carries a cyclic prefix of the reference signal and the cyclic prefix corresponding to the reference signal is located only at the start of the $1^{st}$ part in the M parts, and/or the first resource carries a cyclic postfix of the reference signal and the cyclic postfix corresponding to the reference signal is located only at the end of the last part in the M parts. M is a positive integer.

All related content of the steps in the foregoing method embodiments may be cited in function descriptions of the corresponding functional modules. Details are not described herein again.

The communications apparatus 2000, the communications apparatus 2100, and the communications apparatus 2200 provided in the embodiments of this application may be configured to perform the method provided in the embodiment shown in FIG. 7. Therefore, for technical effects that can be achieved by the communications apparatus 2000, the communications apparatus 2100, and the communications apparatus 2200, refer to the foregoing method embodiments. Details are not described herein again.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedures or the functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

It is clear that a person skilled in the art can make various modifications and variations to embodiments of this application without departing from the spirit and scope of this application. In this way, this application is intended to cover these modifications and variations made to the embodiments of this application provided that they fall within the scope of the claims of this application and their equivalent technologies.

What is claimed is:

1. A reference signal sending method, comprising:
   determining, by a first network device, a first resource, wherein the first resource comprises N time-domain symbols, the N time-domain symbols are consecutive time-domain symbols, and N is an integer greater than or equal to 2;
   generating, by the first network device, a reference signal corresponding to the first resource, wherein the reference signal comprises M parts, all of the M parts are the same, M is an integer greater than or equal to 2, initial phases corresponding to the M parts are the same, and the initial phases corresponding to the M parts are based on an uplink-downlink switching period in which the first resource is located, wherein the first resource carries a cyclic prefix of the reference signal and the cyclic prefix of the reference signal is located only at the start of the $1^{st}$ part in the M parts, and wherein the first resource does not carry a cyclic postfix of the reference signal; and
   sending, by the first network device, the reference signal to a second network device on the first resource.

2. The method according to claim 1, wherein time-domain information of the first resource comprises at least one of the following information:
   a slot in which the first resource is located or slots comprised in the first resource;
   at least one time-domain symbol comprised in the first resource;
   a subframe in which the first resource is located or subframes comprised in the first resource;
   the uplink-downlink switching period in which the first resource is located; or
   a system frame in which the first resource is located.

3. The method according to claim 1, wherein M is equal to 2, and N is equal to 2.

4. The method according to claim 3, wherein each time-domain symbol in the N time-domain symbols carries one part of the M parts.

5. A reference signal receiving method, comprising:
   determining, by a second network device, a second resource for receiving a reference signal, wherein a time-domain symbol comprised in the second resource is at least one of an uplink time-domain symbol or a guard period time-domain symbol; and
   receiving, by the second network device, a part or all of the reference signal from a first network device on the second resource, wherein the reference signal comprises M parts, all of the M parts are the same, M is an integer greater than or equal to 2, and the reference signal is sent on a first resource, wherein the first resource comprises N time-domain symbols, the N time-domain symbols are consecutive time-domain symbols, N is an integer greater than or equal to 2, initial phases corresponding to the M parts are the same, and the initial phases corresponding to the M parts are based on an uplink-downlink switching period in which the first resource is located, wherein the first resource carries a cyclic prefix of the reference signal and the cyclic prefix of the reference signal is located only at the start of the $1^{st}$ part in the M parts, and wherein the first resource does not carry a cyclic postfix of the reference signal.

6. The method according to claim 5, wherein time-domain information of the first resource comprises at least one of the following information:
   a slot in which the first resource is located or slots comprised in the first resource;
   at least one time-domain symbol comprised in the first resource;
   a subframe in which the first resource is located or subframes comprised in the first resource;
   the uplink-downlink switching period in which the first resource is located; or
   a system frame in which the first resource is located.

7. The method according to claim 5, wherein M is equal to 2, and N is equal to 2.

8. The method according to claim 7, wherein each time-domain symbol in the N time-domain symbols carries one part of the M parts.

9. A network device, comprising:
   a processor, configured to:
      determine a first resource, wherein the first resource comprises N time-domain symbols, the N time-domain symbols are consecutive time-domain symbols, and N is an integer greater than or equal to 2; and
      generate a reference signal corresponding to the first resource, wherein the reference signal comprises M parts, all of the M parts are the same, M is an integer greater than or equal to 2, initial phases corresponding to the M parts are the same, and the initial phases corresponding to the M parts are based on an uplink-downlink switching period in which the first resource is located, wherein the first resource carries a cyclic prefix of the reference signal and the cyclic prefix of the reference signal is located only at the start of the $1^{st}$ part in the M parts, and wherein the first resource does not carry a cyclic postfix of the reference signal; and
   a transceiver, configured to send the reference signal to a second network device on the first resource.

10. The network device according to claim 9, wherein time-domain information of the first resource comprises at least one of the following information:
    a slot in which the first resource is located or slots comprised in the first resource;
    at least one time-domain symbol comprised in the first resource;

a subframe in which the first resource is located or subframes comprised in the first resource;

the uplink-downlink switching period in which the first resource is located; and a system frame in which the first resource is located.

11. The network device according to claim 9, wherein M is equal to 2, and N is equal to 2.

12. The network device according to claim 11, wherein each time-domain symbol in the N time-domain symbols carries one part of the M parts.

13. A network device, comprising:

a processor, configured to determine a second resource used to receive a reference signal, wherein a time-domain symbol comprised in the second resource is at least one of an uplink time-domain symbol or a guard period time-domain symbol; and a transceiver, configured to receive a part or all of the reference signal from a first network device on the second resource, wherein the reference signal comprises M parts, all of the M parts are the same, M is an integer greater than or equal to 2, and the reference signal is sent on a first resource, wherein the first resource comprises N time-domain symbols, the N time-domain symbols are consecutive time-domain symbols, N is an integer greater than or equal to 2, initial phases corresponding to the M parts are the same, and the initial phases corresponding to the M parts are based on an uplink-downlink switching period in which the first resource is located, wherein the first resource carries a cyclic prefix of the reference signal and the cyclic prefix of the reference signal is located only at the start of the $1^{st}$ part in the M parts, and wherein the first resource does not carry a cyclic postfix of the reference signal.

14. The network device according to claim 13, wherein time-domain information of the first resource comprises at least one of the following information:

a slot in which the first resource is located or a slot comprised in the first resource;

a time-domain symbol comprised in the first resource;

a subframe in which the first resource is located or a subframe comprised in the first resource;

the uplink-downlink switching period in which the first resource is located; and a system frame in which the first resource is located.

15. The network device according to claim 13, wherein M is equal to 2, and N is equal to 2.

16. The network device according to claim 15, wherein each time-domain symbol in the N time-domain symbols carries one part of the M parts.

* * * * *